United States Patent
Mudumba et al.

(10) Patent No.: US 12,254,063 B2
(45) Date of Patent: Mar. 18, 2025

(54) CROSS-MODALITY CURIOSITY FOR SPARSE-REWARD TASKS

(71) Applicant: ServiceNow, Inc., Santa Clara, CA (US)

(72) Inventors: Sai Rajeswar Mudumba, Montreal (CA); Cyril Ibrahim, Montreal (CA); Nitin Surya, Gurugram (IN); Florian Golemo, Montreal (CA); David Vasquez, Montreal (CA); Pedro O. Pinheiro, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 603 days.

(21) Appl. No.: 17/681,362

(22) Filed: Feb. 25, 2022

(65) Prior Publication Data

US 2022/0300585 A1    Sep. 22, 2022

Related U.S. Application Data

(60) Provisional application No. 63/163,999, filed on Mar. 22, 2021.

(51) Int. Cl.
*G06F 18/214* (2023.01)
*G06F 16/23* (2019.01)
(Continued)

(52) U.S. Cl.
CPC ........ *G06F 18/214* (2023.01); *G06F 16/2379* (2019.01); *G06F 16/2455* (2019.01); *G06F 18/217* (2023.01)

(58) Field of Classification Search
CPC .............. G06F 18/214; G06F 16/2379; G06F 16/2455; G06F 18/217
(Continued)

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Abadi et al., "Tensorflow: Largescale machine learning on heterogeneous distributed systems", arXiv, Mar. 16, 2016.

(Continued)

*Primary Examiner* — Hanh B Thai
(74) *Attorney, Agent, or Firm* — McDonnell Beohnen Hulbert & Berghoff LLP

(57) ABSTRACT

Embodiments are provided that include generating, by an inter-modal predictor, predicted second-mode information for a first text-based record based on first-mode information of the first text-based record. Embodiments also include generating a first value by evaluating a first loss function that is based on a first difference between the second-mode information of the first text-based record as predicted and as observed; updating the inter-modal predictor based on the first value; generating, by the updated inter-modal predictor, predicted second-mode information for a second text-based record in the database based on first-mode information of the second text-based record; generating a second value by evaluating a second loss function that is based on a second difference between the second-mode information of the second text-based record as predicted and as observed; and training an operational model based on the second value.

20 Claims, 13 Drawing Sheets

(51) Int. Cl.
*G06F 16/2455* (2019.01)
*G06F 18/21* (2023.01)

(58) Field of Classification Search
USPC ........................................................ 707/803
See application file for complete search history.

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,210,860 B1* | 2/2019 | Ward .................... G06N 3/044 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,222,217 B1* | 1/2022 | Zhang .................. G06F 18/214 |
| 11,706,499 B2* | 7/2023 | Bennett ................ H04N 21/242 |
| | | 706/25 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2018/0123940 A1 | 5/2018 | Rimar et al. |
| 2019/0104398 A1 | 4/2019 | Owen et al. |
| 2019/0108448 A1* | 4/2019 | O'Malia ................. G06N 3/04 |
| 2019/0156248 A1 | 5/2019 | Togashi .............. G06F 18/214 |
| 2019/0244060 A1* | 8/2019 | Dundar .................. G06T 15/00 |
| 2019/0303765 A1* | 10/2019 | Gou ...................... G06N 3/006 |
| 2019/0347523 A1* | 11/2019 | Rothberg ............... G06N 3/045 |
| 2019/0370616 A1* | 12/2019 | Eser ................... G06F 18/256 |
| 2019/0371476 A1* | 12/2019 | Hernandez ............ G16H 50/50 |
| 2019/0384810 A1* | 12/2019 | Huang .................. G06F 40/56 |
| 2020/0012953 A1* | 1/2020 | Sun ....................... G06F 40/30 |
| 2020/0050689 A1 | 2/2020 | Tal et al. |
| 2020/0204443 A1 | 6/2020 | Bar Oz et al. |
| 2020/0302225 A1* | 9/2020 | Dutta .................. G06V 10/7715 |
| 2020/0364562 A1* | 11/2020 | Khoreva ............... G06N 3/08 |
| 2020/0364876 A1* | 11/2020 | Mohan ................ G06V 10/454 |
| 2021/0019642 A1* | 1/2021 | O'Malia ............... G06F 40/279 |
| 2021/0049357 A1* | 2/2021 | Sarkar .................. G06N 3/044 |
| 2021/0194764 A1 | 6/2021 | Badyan et al. |
| 2021/0276547 A1* | 9/2021 | Narayanan .......... B60W 30/0956 |
| 2021/0286371 A1* | 9/2021 | Choi .................... G05D 1/0219 |
| 2021/0358164 A1* | 11/2021 | Liu ....................... G06N 3/088 |

(56) References Cited

U.S. PATENT DOCUMENTS

| | | | | |
|---|---|---|---|---|
| 2021/0374518 | A1* | 12/2021 | Zhu | G06N 3/045 |
| 2022/0044391 | A1* | 2/2022 | Wallingford | G06V 10/82 |
| 2023/0125522 | A1* | 4/2023 | Kibardin | G06N 3/084 |
| | | | | 706/15 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Andrychowicz et al., "Hindsight Experience Replay", Feb. 23, 2018.
Bahdanau et al., "Learning to Understand Goal Specifications By Modelling Reward", Dec. 23, 2019.
Barto et al., "Intrinsically Motivated Learning of Hierarchical Collections of Skills", 8 pages.
Bellemare et al., "Unifying Count-Based Explorations and Intrinsic Motivation", Nov. 7, 2016.
Burda et al., "Large-Scale Study of Curiosity-Driven Learning", Aug. 13, 2018.
Burda et al., "Exploration By Random Network Distillation", Oct. 30, 2018.
Calandra et al., "More Than a Feeling: Learning to Grasp and Regrasp using Vision and Tough", IEEE Robotics and Automation Letters, Jul. 26, 2018.
Chen et al., "Batch Exploration with Examples for Scalable Robotic Reinforcement Learning", Apr. 23, 2021.
Chen et al., "SoundSpaces: Audio-Visual Navigation in 3D Environments", Aug. 21, 2020.
Clarke et al., "Learning Audio Feedback for Estimating Amount and Flow of Granular Material", Robotics Institute, 2nd Conference on Robot Learning (CoRL 2018).
Connolly et al., "Effects of stimulus incongruity on children's curiosity as measured by looking time and expression change", Psychon. Sci., 1971, vol. 25 (4), pp. 232-234.
Coumans et al., "PyBullet Quickstart Guide: A python module for physics simulation in robotics, games and machine learning", 2017.
Virginia R. de Sa, "Learning Classification with Unlabeled Data", In NeurIPS, 1993, pp. 112-119.
Dean et al., "See, Hear, Explore: Curiosity via Audio-Visual Association", Jan. 18, 2021.
Di Domenico et al., "The Emerging Neuroscience of Intrinsic Motivation: A New Frontier in Self-Determination Research", Frontiers in Human Neuroscience, Mar. 2017, vol. 11, Article 145.
Dubey et al., "Understanding exploration in humans and machines by formalizing the function of curiosity", To appear at Current Opinion in Behavioral Sciences, Jul. 23, 2020.
Deisenroth et al., "Learning to Control a Low-Cost Manipulator using Data-Efficient Reinforcement Learning", 8 pages.
Forestier et al., "Intrinsically Motivated Goal Exploration Processes with Automatic Curriculum Learning", Journal of Machine Learning Research 23 (2022), 1-41, May 5, 2022.
Gan et al., "Large-Scale Adversarial Training for Vision-and-Language Representation Learning", 34th Conference on Neural Information Processing Systems (NeurIPS 2020), Oct. 22, 2020.
Gao et al., "Learning to Separate Object Sounds by Watching Unlabeled Video", Jul. 26, 2018.
Gao et al., "Deep Learning for Tactile Understanding From Visual and Haptic Data", Apr. 12, 2016.
Haarnoja et al., "Soft Actor-Critic: Off-Policy Maximum Entropy Deep Reinforcement Learning with a Stochastic Actor", Aug. 8, 2018.
Huang et al., "Learning Gentle Object Manipulation with Curiosity-Driven Deep Reinforcement Learning", Mar. 20, 2019.
Kalakrishnan et al., "Learning Force Control Policies for Compliant Robotic Manipulation", 2011.
Kingma et al., "Adam: A Method For Stochastic Optimization", Jan. 30, 2017.
Klyubin et al., "Empowerment: A Universal Agent-Centric Measure of Control", IEEE Congress on Evolutionary Computation, 2005.
Kober et al., Reinforcement Learning to Adjust Robot Movements to New Situations, 2011.
Lair et al., "Language Grounding through Social Interactions and Curiosity-Driven Multi-Goal Learning", Nov. 8, 2019.
Lee et al., "Making Sense of Vision and Touch: Self-Supervised Learning of Multimodal Representations for Contact-Rich Tasks", Mar. 8, 2019.
Levine et al., "End-to-End Training of Deep Visuomotor Policies", Apr. 19, 2016.
Li et al., "Connecting Touch and Vision via Cross-Modal Prediction", Jun. 14, 2019.
Lim et al., "Neural Multisensory Scene Inference", Nov. 8, 2019.
Liu et al., "Learning End-to end Multimodal Sensor Policies for Autonomous Navigation", Nov. 1, 2017.
Marino et al., "Hierarchical RL Using An Ensemble Of Proprioceptive Periodic Policies", ICLR 2019.
Martino et al., "Cross-modal interaction between vision and touch: the role of synesthetic correspondence", Perception, 2000, vol. 29, pp. 745-754.
Mnih et al., "Playing Atari with Deep Reinforcement Learning", Dec. 19, 2013.
Mnih et al., "Asynchronous Methods for Deep Reinforcement Learning", Jun. 16, 2016.
Murali et al., "Learning to Grasp without Seeing", May 10, 2018.
Ostrovski et al., "Count-Based Exploration with Neural Density Models", Jun. 14, 2017.
Oudeyer et al., "What is intrinsic motivation? A typology of computational approaches", frontiers in Neurorobotics, Nov. 2007, vol. 1, Article 6.
Oudeyer et al., "Intrinsic Motivation Systems for Autonomous Mental Development", IEEE Transactions on Evolutionary Computation, vol. 11, No. 2, Apr. 2007.
Owens et al., "Audio-Visual Scene Analysis with Self-Supervised Multisensory Features", Oct. 9, 2018.
Paszke et al., "PyTorch: An Imperative Style, High-Performance Deep Learning Library", Dec. 3, 2019.
Pathak et al., "Curiosity-driven Exploration by Self-supervised Prediction", May 15, 2017.
Pathak et al., "Self-Supervised Exploration via Disagreement", Jun. 10, 2019.
Pong et al., "Skew-Fit: State-Covering Self-Supervised Reinforcement Learning", Aug. 4, 2020.
Raileanu et al., "RIDE: Rewarding Impact-Driven Exploration For Procedurally-Generated Environments", Feb. 29, 2020.
Savinov et al., "Episodic Curiosity Through Reachability", Aug. 6, 2019.
Schmidhuber et al., "A Possibility for Implementing Curiosity and Boredom in Model-Building Neural Controllers", 7 pages.
Sekar et al., "Planning to Explore via Self-Supervised World Models", Jun. 30, 2020.
Maddison et al., "Mastering the game of Go with deep neural networks and tree search", ResearchGate, Jan. 2016.
Smith et al., "3D Shape Reconstruction from Vision and Touch", Nov. 2, 2020.
Srivastava et al., "Multimodal Learning with Deep Boltzmann Machines", Journal of Machine Learning Research 15, 2014, pp. 2949-2980.
Stadie et al., "Incentivizing Exploration In Reinforcement Learning With Deep Predictive Models", Nov. 19, 2015.
Strehl et al., "An analysis of model-based Interval Estimation for Markov Decision Processes", Journal of Computer and System Sciences, 74 (2008), pp. 1309-1331.
Van Hoof et al., "Stable Reinforcement Learning with Autoencoders for Tactile and Visual Data", Proc. 2016 IEEE International Conference on Intelligent Robots and Systems, 8 pages.
Vernon et al., "A Roadmap for Cognitive Development in Humanoid Robots", 2011.
Wang et al., "3D Shape Perception from Monocular Vision, Touch, and Shape Priors", Aug. 9, 2018.

(56) References Cited

OTHER PUBLICATIONS

Xu et al., "Empirical Evaluation of Rectified Activations in Convolution Network", Nov. 27, 2015.
Yu et al., "Meta-World: A Benchmark and Evaluation for Multi-Task and Meta Reinforcement Learning", Jun. 14, 2021.
Zhu et al., "Vision-Language Navigation with Self-Supervised Auxiliary Reasoning Tasks", Apr. 1, 2020.
Zhu et al., "Reinforcement and Imitation Learning for Diverse Visuomotor Skills", May 27, 2018.

* cited by examiner

CROSS-MODALITY CURIOSITY FOR SPARSE-REWARD TASKS

CROSS-REFERENCE TO RELATED APPLICATION

The present application is a non-provisional patent application claiming priority to U.S. Provisional Patent Application No. 63/163,999, filed on Mar. 22, 2021, the contents of which are hereby incorporated by reference.

BACKGROUND

It is beneficial in a variety of applications to train reinforcement learning agents, classifiers, encoders, or other machine learning models to perform tasks of interest (e.g., classifying images, allocating incoming incident reports to appropriate human technicians, responding automatically to incident reports and/or user chat requests, operating a robot to assemble a device or to otherwise manipulate objects in an environment). However, obtaining sufficient data to train such models to perform such tasks can be difficult. Further, once obtained, it can be difficult to apply such data such that the model(s) trained therefrom are able to respond to a range of possible input scenarios, including rare or even novel scenarios that are represented rarely, or not at all, in the available training data.

SUMMARY

A first example embodiment may involve a computer-implemented method that includes: (i) accessing a database that contains a plurality of text-based records related to a network, wherein each text-based record has a first aspect and a second aspect that differs from the first aspect, wherein the first aspect of each text-based record in the database is represented by respective first-mode information, and wherein the second aspect of each text-based record in the database is represented by respective second-mode information; (ii) generating, by an inter-modal predictor, predicted second-mode information for a first text-based record in the database based on first-mode information of the first text-based record; (iii) generating a first value by evaluating a first loss function that is based on a first difference between second-mode information of the first text-based record and the predicted second-mode information for the first text-based record; (iv) updating the inter-modal predictor based on the first value; (v) generating, by the inter-modal predictor as updated, predicted second-mode information for a second text-based record in the database based on first-mode information of the second text-based record; (vi) generating a second value by evaluating a second loss function that is based on a second difference between second-mode information of the second text-based record and the predicted second-mode information for the second text-based record; and (vii) based on the second value, training an operational model to receive a text-based record and to generate, based on the text-based record, at least one of: a modification of the text-based record, a command to modify an aspect of operation of the network, or a communication to a user of the network.

A second example embodiment may involve a computer-implemented method that includes: (i) during an exploration period, generating a set of training data by repeatedly: (a) detecting first state information about an environment at a first time step, wherein the first state information includes a first-mode portion about a first aspect of the environment at the first time step and a second-mode portion about a second aspect of the environment at the first time step, wherein the second aspect differs from the first aspect, and wherein the first state information is included in the set of training data; (b) applying the first state information to an exploration policy to generate a first action, wherein the first action is included in the set of training data; (c) performing the first action in the environment; (d) detecting second state information about the environment at a second time step that is a result of performing the first action in the environment, wherein the second state information includes a first-mode portion about the first aspect of the environment at the second time step and a second-mode portion about the second aspect of the environment at the second time step, and wherein the second state information is included in the set of training data; (e) generating a predicted second-mode portion of the second state information by (1) applying the first-mode portion of the second state information to an encoder to generate an encoder output, and (2) applying the encoder output to a decoder to generate the predicted second-mode portion of the second state information; and (f) updating the exploration policy and the decoder by evaluating a loss function that is based on a difference between the second-mode portion of the second state information as detected and as predicted; and (ii) based on the set of training data generated during the exploration period, training an exploitation policy to generate, based on input state information about the environment, a second action such that performance of the second action improves an objective function, wherein the input state information includes a first-mode portion about the first aspect of the environment and a second-mode portion about the second aspect of the environment.

In a third example embodiment, an article of manufacture may include a non-transitory computer-readable medium, having stored thereon program instructions that, upon execution by a computing system, cause the computing system to perform operations in accordance with the first example embodiment or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment or the second example embodiment.

In a fifth example embodiment, a system may include various means for carrying out each of the operations of the first example embodiment or the second example embodiment.

In a sixth example embodiment, a computational instance of a remote network management platform is provided that includes: (i) a database, and (ii) one or more processors configured to perform operations in accordance with the first example embodiment or the second example embodiment in connection with the database.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
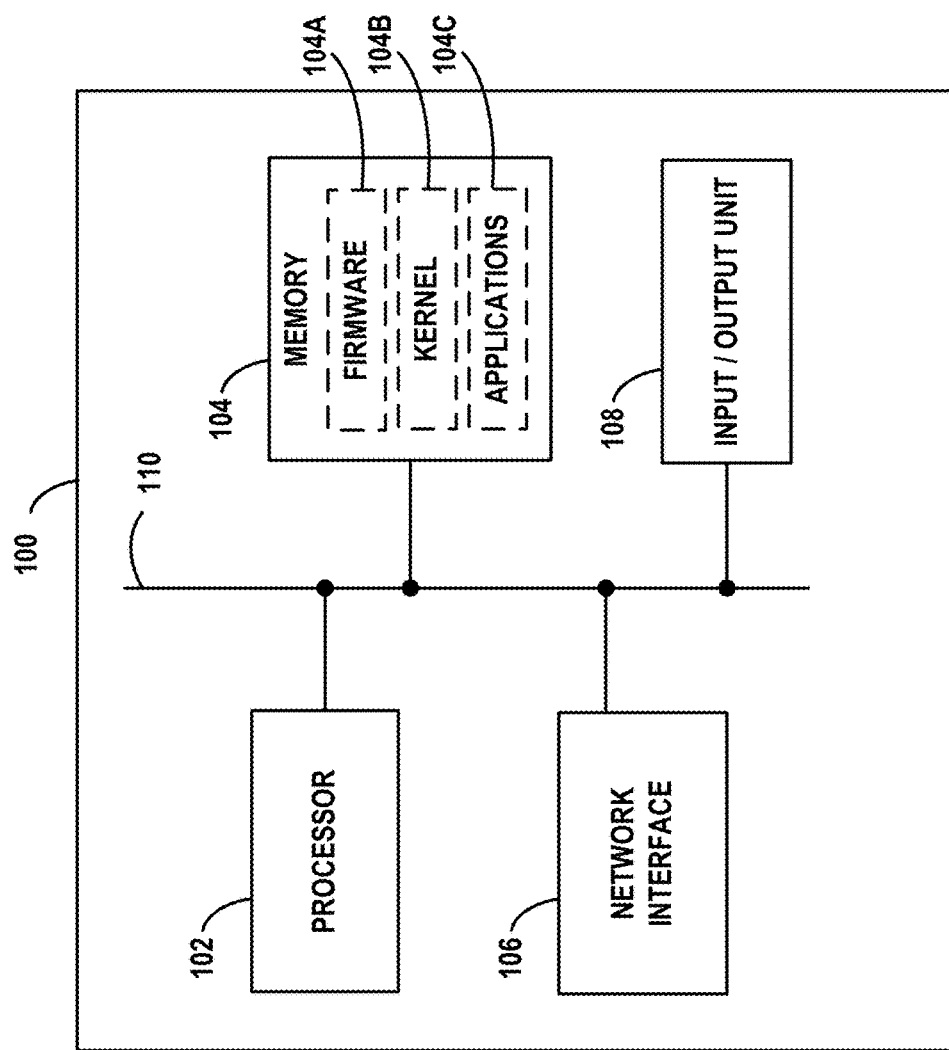
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
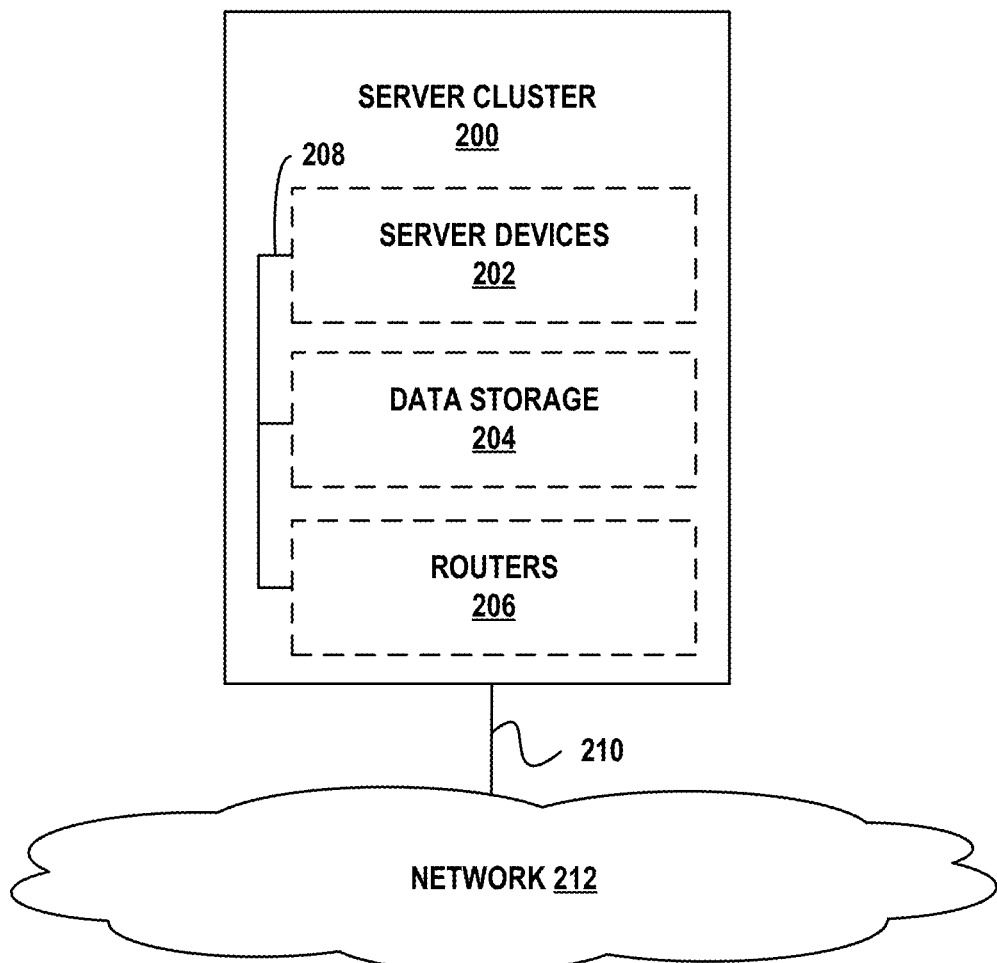
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
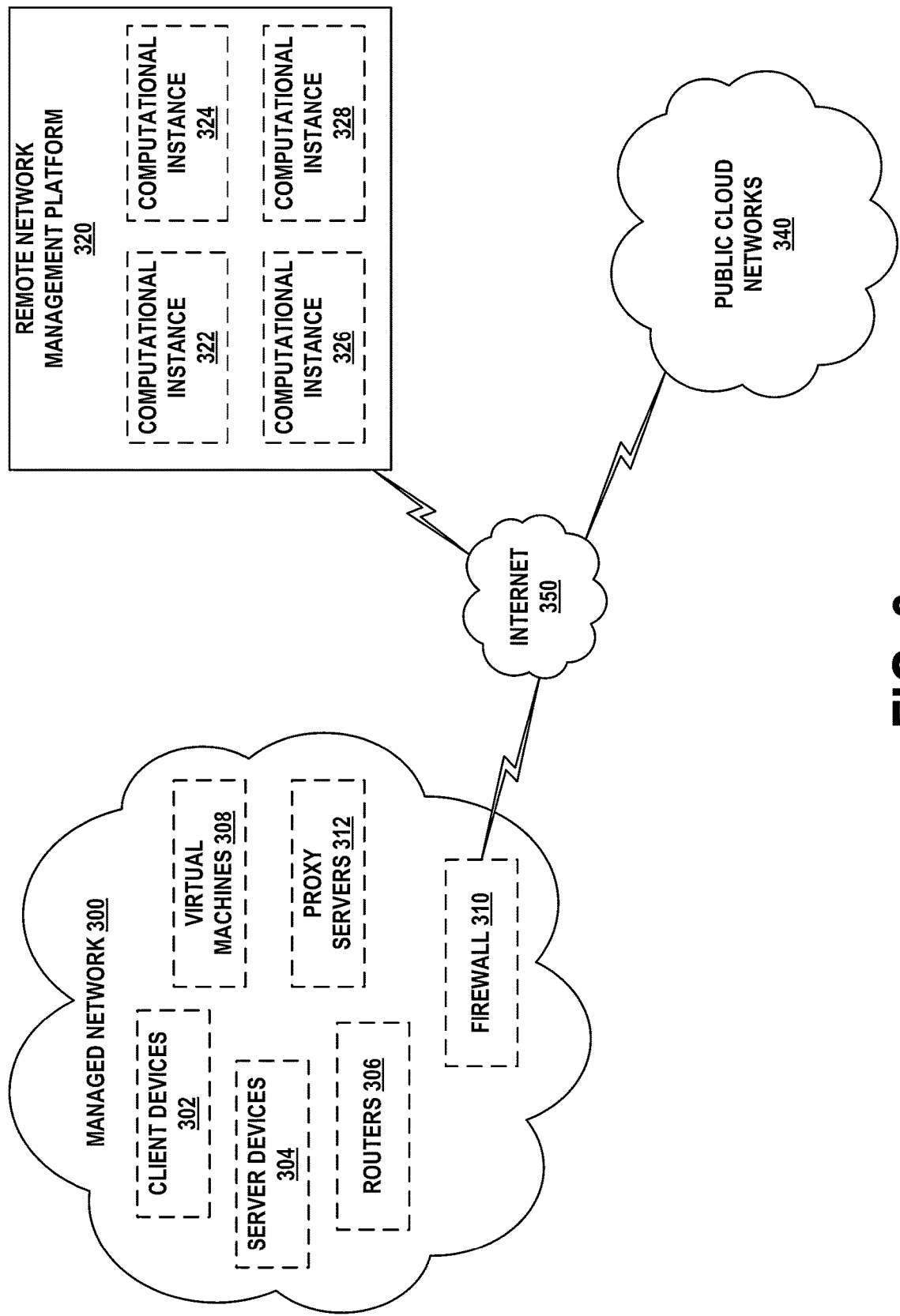
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
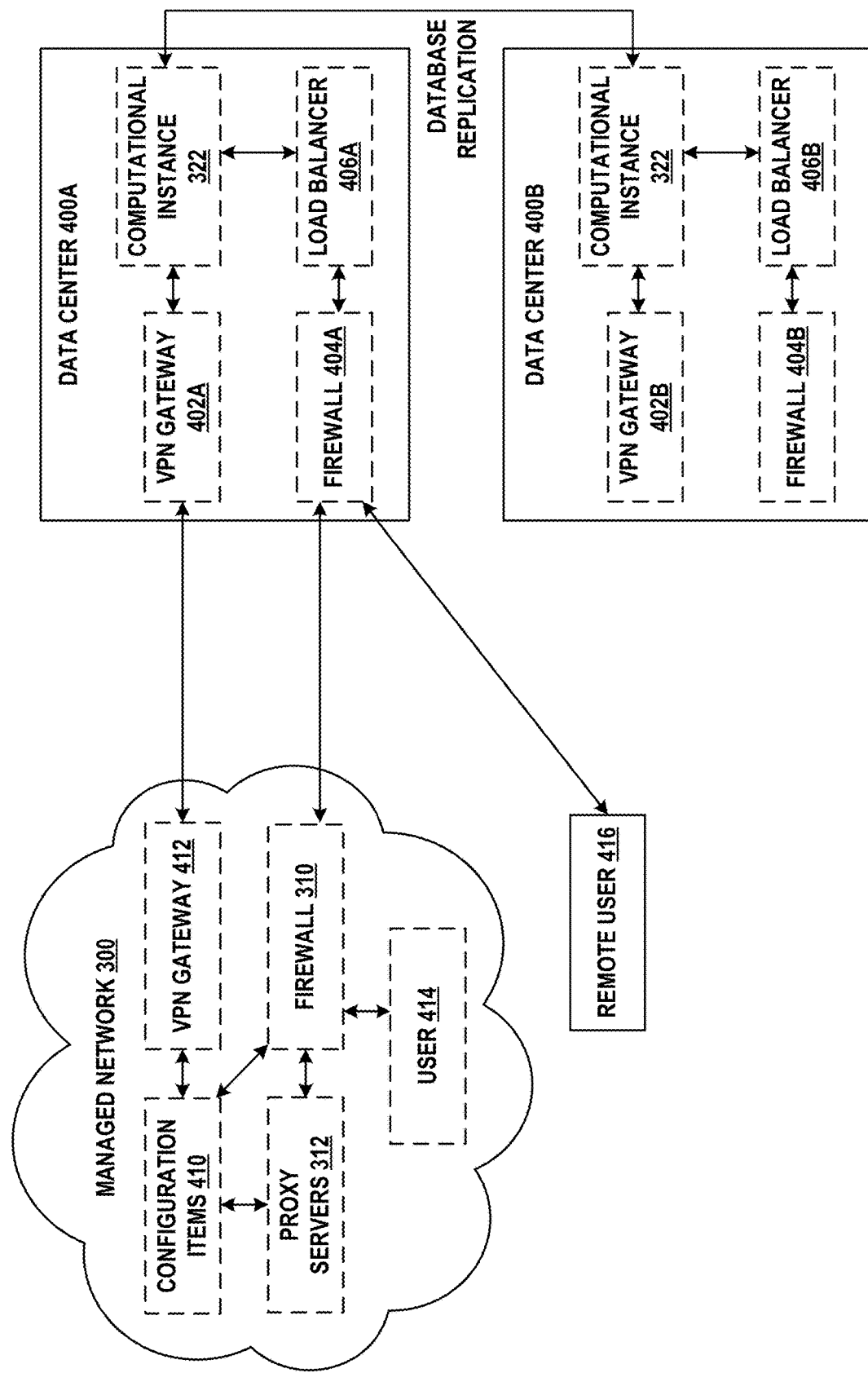
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
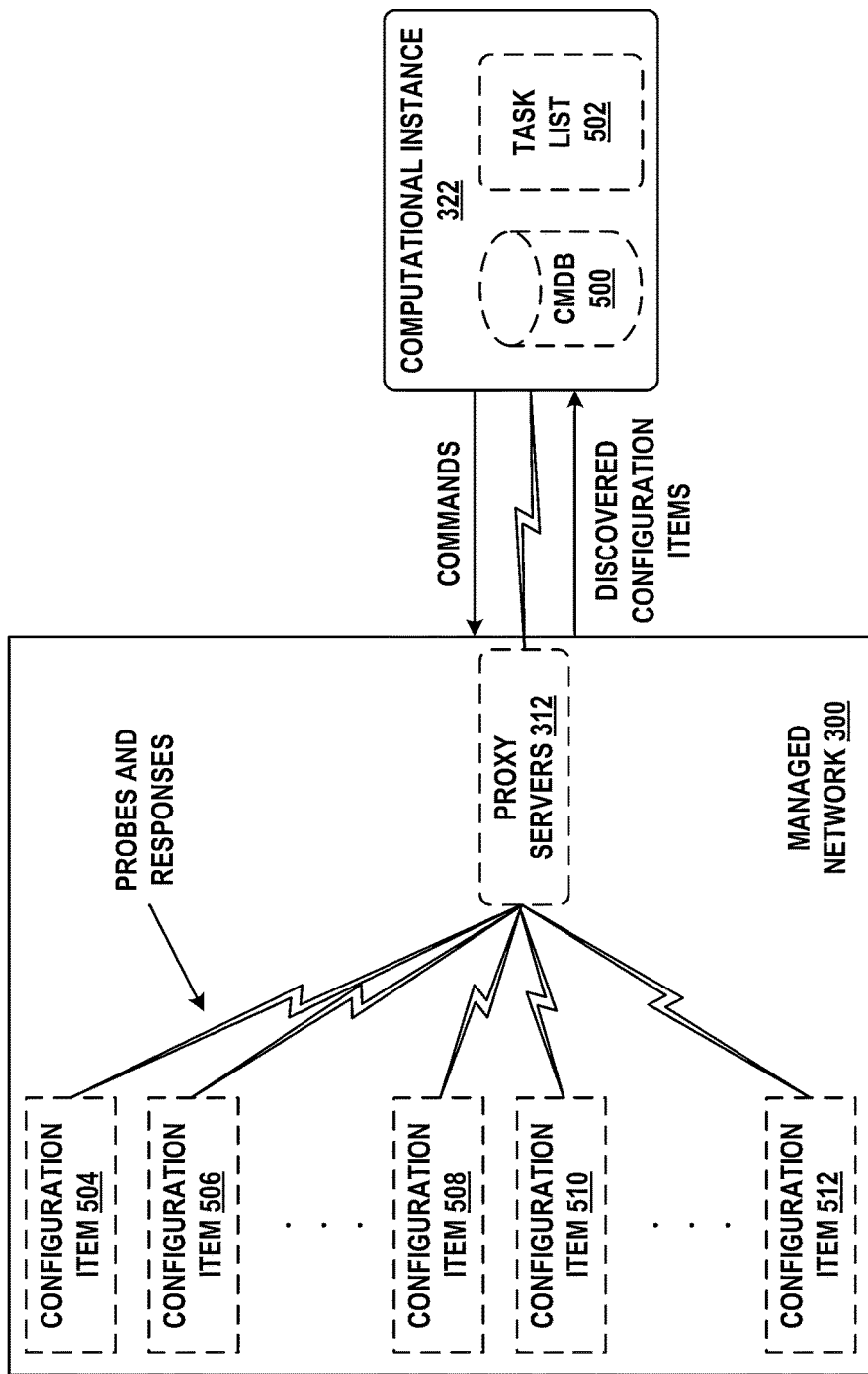
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
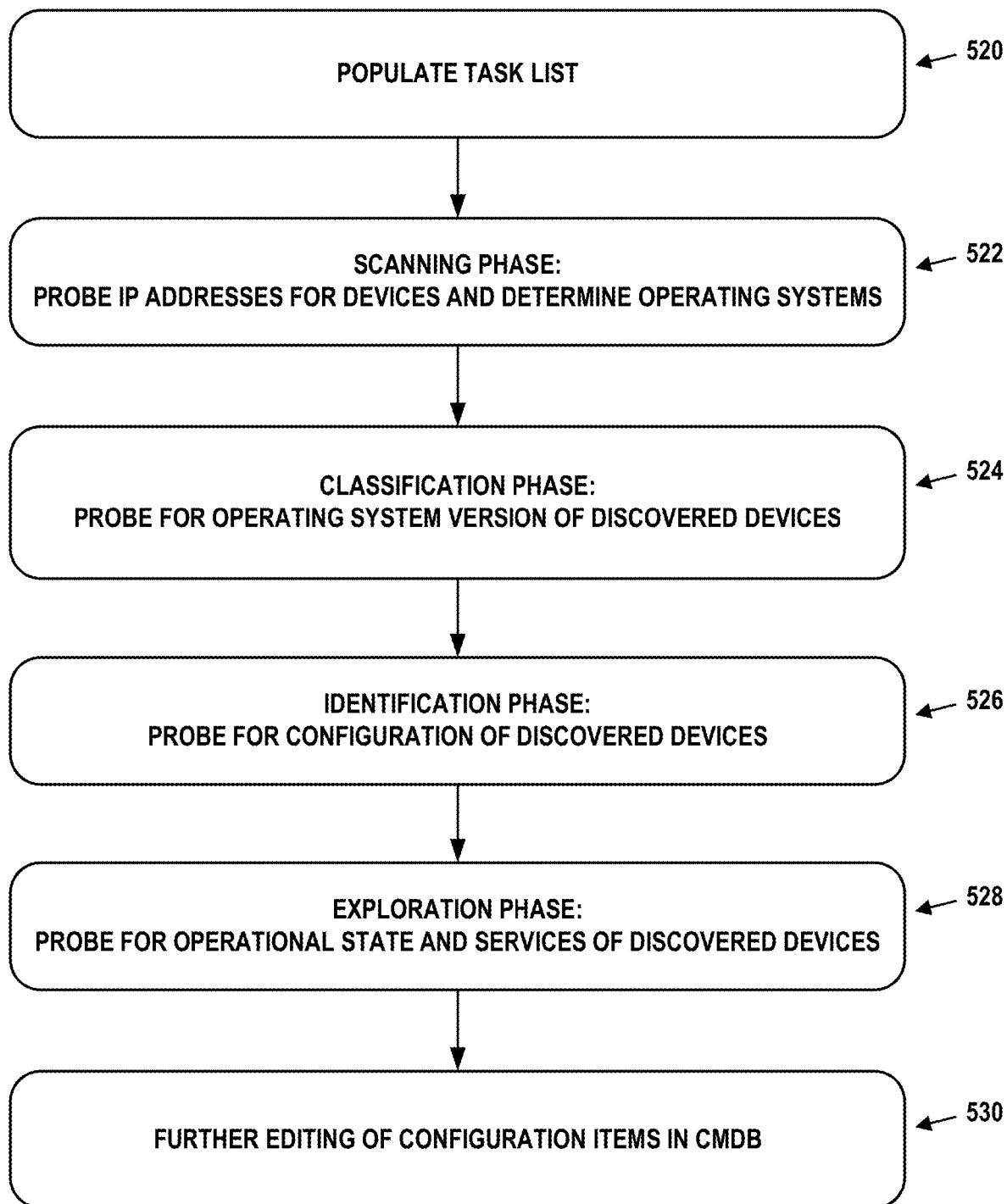
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE CROSS-MODALITY LEARNING

It can be difficult and/or expensive to obtain and apply "good" data to train a variety of machine learning models. This can include difficulties in obtaining such data originally (e.g., generating useful exploration "experiences" for an agent or other model trained via reinforcement learning) and/or in selecting, curating, emphasizing, weighting, or otherwise applying available training data to train an artificial neural network, decision tree, or other machine learning model such that the "rarer" or "more interesting" training examples adequately influence the trained model without being displaced by more common, and potentially "easier" to solve, training examples. For example, such that a classifier, scheduler, virtual agent, or other model trained to act on input incident reports or other information related to a managed network is able to react correctly to rare or even novel inputs in addition to accurately responding to inputs that are more commonly represented in a training dataset or stream in incoming incident reports.

One aspect of this difficulty in acquiring and/or applying training data is the difficulty of generating an easily-computable, generally applicable objective function or other description for exploring an environment and/or selecting, curating, weighting, or otherwise emphasizing more useful training data. Manually describing, in a computer-implementable manner, an objective function to identify "interesting" or "useful" training data or environmental states/inputs/regions can be difficult to do even when the broad meaning of "interesting" or "useful" can be conceptualized or articulated in human terms. Indeed, in many applications it is difficult to even determine what such a goal should be in human terms. For example, it is difficult to describe, in plain human language, what makes an input incident report "useful," "complex," or "difficult" with respect to determining a problem statement or solution from the incident report, classifying the incident report, extracting useful information about the underlying operation of a managed network, or with respect to some other application of interest.

One method for identifying, seeking, or otherwise quantifying such an "interestingness" of an input is to formulate an objective function related to the "unexpectedness" of the input. For example, a machine learning model or other predictive algorithm could be trained to attempt to predict some aspect of the input (e.g., to predict a subsequent input based on a first input and an action taken based the first input). An objective function related to the "interestingness" of the input could then determined based to the model's ability to predict that aspect of the input (e.g., a sum of squared differences between the predicted and observed aspect of the input). This objective function could then be used to, e.g., motivate an exploration agent in a reinforcement learning context to pursue more "unpredictable" inputs, thereby leading to the generation of more varied, and more valuable, exploration "sense data" with which to train an exploitation agent to pursue a specified application-specific goal. In another example, a set of example inputs in a set of training data could be evaluated in this way to select, replicate, weight, or otherwise emphasize more "surprising"/less "predictable" example inputs when training a classifier, artificial neural network, decision tree, or other machine learning model.

Such a measure of "surprise" could be generated in a variety of ways. As noted above, such a "surprise" measure could be determined by comparing an input with a prediction of that input based on past input(s), agent action(s), etc. Additionally or alternatively, one aspect, or "modality," of an input could be predicted from another aspect of the input. Inputs for which the prediction is less accurate are more "surprising," and so could be used/emphasized in training a machine learning model, used to motivate an exploration agent in a reinforcement learning context, etc. Robots or other automated agents (e.g., virtual agents configured to manage, classify, respond to, resolve, or otherwise interact with incident reports or other elements of a remotely managed network) in many real-world settings have access to input data from multiple different modalities that may contain related information. For example, in addition to visual input from a camera, a robot may include force/torque sensors in their gripper and tactile sensing is often necessary in tasks that involve contact-rich motion. In another example, a virtual agent could have access to textual notes about the resolution of an incident described in an incident report and access to timing, biographical data, administrative data, user-provided problem summaries, or other information about the incident report.

As noted above, more "surprising" inputs will be less predictable from one mode to another (or "cross-modally"), so the disagreement (e.g., mean error, L2 error) between the observation of a first mode of an input and the prediction of that first mode based on a second mode of the input could be used as an objective function. Exploration and model training methods described herein leverage 'surprise' from mismatches in feedback between different input modalities (e.g., mismatches between actually detected touch feedback and 'anticipated' touch feedback predicted from visual input, mismatches between actually detected incident report classifications and classifications 'anticipated' based on the textual or other portions of the incident reports) to guide exploration in difficult-to-learn sparse-reward tasks (e.g., reinforcement learning tasks) and/or to select or emphasize training examples when training a model using stored training examples via supervised, semi-supervised, or unsupervised training methods.

Such a "surprise"-based objective can be determined in a variety of ways in a variety of scenarios. In a reinforcement learning scenario, the inter-modal predictive model prediction of the input could be compared to the observed input and the difference used to generate (e.g., via sum of squared differences, mean square difference) an objective function. That objective function could then be used to update the inter-model predictor (to attempt to improve its ability to predict one modality of the input from another modality) and to update a "exploration agent" used to generate "actions" that are then implemented, via interaction with/movement through an environment, to generate further inputs. The set of actions and observed inputs generated by such an exploration agent (a "trajectory" of exploration of the environment by the exploration agent) could later be used to train an "exploitation agent" to pursue a specified task-related objective (e.g., to open a door, to move an object) and/or to train some other machine learning model to perform some other task (e.g., to classify inputs, to generate summaries of incident reports, to generate and/or select potential solutions for incident reports). In a scenario wherein training data examples are pre-stored, the inter-modal predictive model prediction of individual example inputs within the set of training data examples could be compared to the respective observed inputs and the differences used to generate (e.g., via sum of squared differences, mean square difference) an objective function value for each of the example inputs in the training data set. These objective function values could then be used to select a subset of the training data examples, to replicate training data examples, to weight the training data examples, or to otherwise emphasize more "surprising" examples when using the training data examples to train an artificial neural network, decision tree, regression tree, or other machine learning model to classify the input, to generate a potential solution to an incident report represented by the input, to summarize an incident report represented by the input, to respond to a user query or response represented by the input, or to generate some other output based on an input.

Predicting one aspect of an input (e.g., haptic input, a user's status in a database) based on another aspect of the input (e.g., a visual input, a textual query input by the user) can be achieved in a variety of ways. Such a cross-modal predictor could include convolutional neural networks, filters, artificial neural networks, regression trees, decision trees, linear or nonlinear regression, nonlinear kernels, or other predictive model structures. For example, an inter-modal predictor could include an encoder to translate a first aspect of an input (e.g., an image or other visual input) into a latent variable embedding vector, which is then applied to a decoder of the inter-modal predictor to output a prediction of a second aspect of the input (e.g., a set of received force values or some other haptic input). An objective function value could then be determined based on the predicted second aspect by determining a mean squared difference, average difference, or some other function of the difference between the second aspect of the input as predicted and as observed. In some examples, the encoder and decoder could both be trained based on the generated objective function values. Alternatively, the encoder could be static (e.g., randomly initialized, or based on a previously-trained generic encoder) and only the decoder could be updated based on the generated objective function values.

In some examples, the objective function value generated based on the output of the cross-model predictive model could be augmented, e.g., to avoid local minima in an environment in a reinforcement learning scenario wherein the two aspects of the input are particularly unpredictable from each other. This could include using a forward predictive model to predict an input (e.g., both aspects of an input, or only one aspect) based on previously observed input(s) and/or action(s) generated by a reinforcement learning agent that resulted in the observed input. In an example, such a forward predictive model could be trained to predict the latent variable representation of the current input based on the latent variable representation of the input at a previous time step and the action that was performed to 'move' the agent from the previous time step to the current input. An objective function value could then be determined based on the predicted current input by determining a mean squared difference, average difference, or some other function of the difference between the current the input as predicted and as observed. This forward predictive objective function value could then be combined (e.g., as a weighted combination) with the cross-model predictive objective function value to generate an overall objective function value that can be used to update a reinforcement learning agent, to update one or more of the predictive models, etc.

Figure 6:
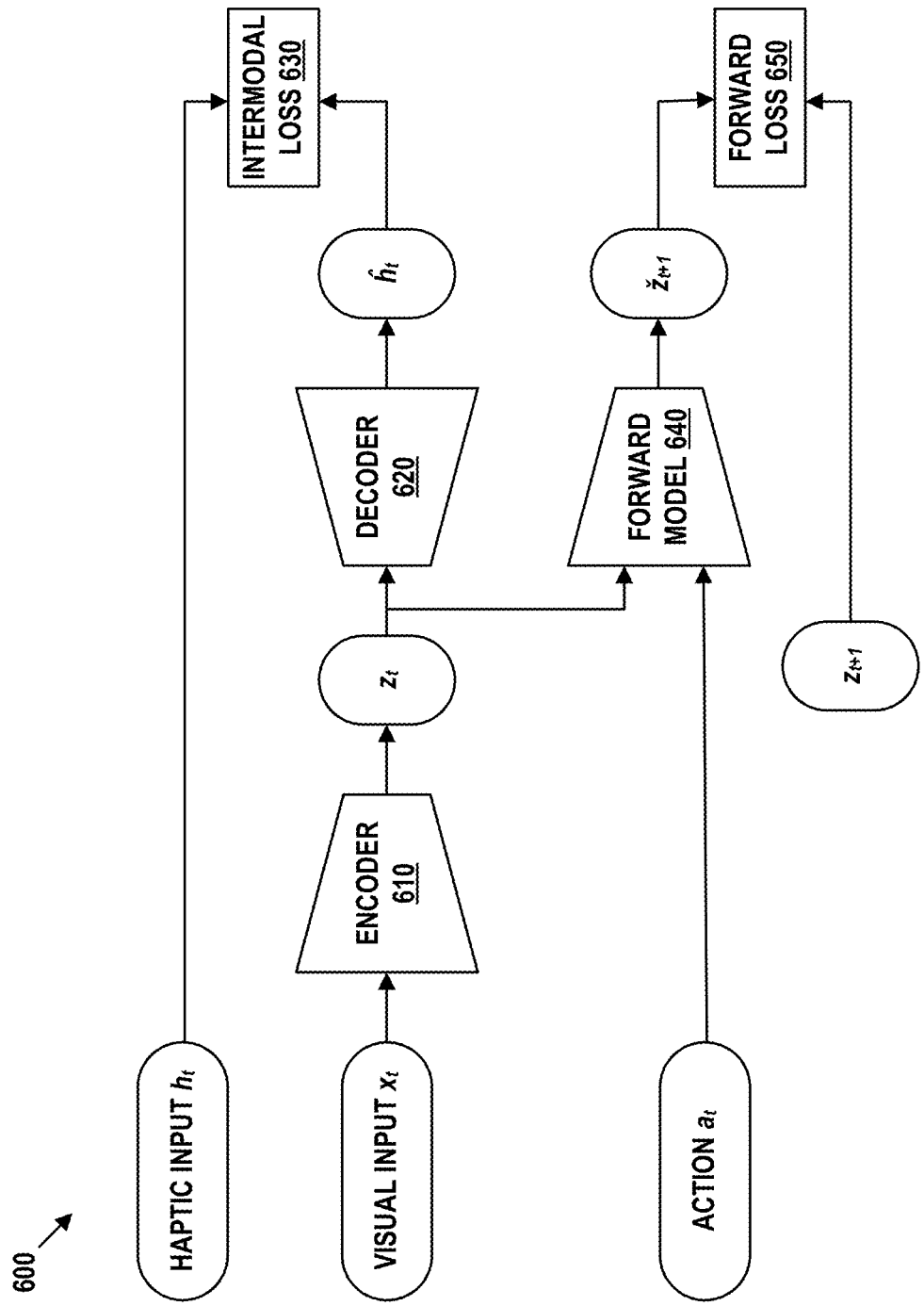
FIG. 6 is a flow chart, in accordance with example embodiments.

FIG. 6 depicts an example of such an augmented predictive method 600 for generating cross-modal "surprise"-based objective function values. In the method 600 of FIG. 6, the first aspect of the input is a haptic input $h_t$ sensed by a robot and the second aspect of the input $x_t$ is a visual input sensed by the robot. The visual input $x_t$ is applied to an encoder 610 to generate a latent variable embedding vector $z_t$ representing the visual input $x_t$. The latent variable embedding vector $z_t$ is then applied to a decoder 620 to generate a predicted haptic input fit. The predicted fit and observed $h_t$ haptic inputs are then applied to an intermodal loss function 630 to generate an intermodal loss objective function value. The latent variable embedding vector $z_t$ is also applied, along with an action at taken based on the observed input [$h_t$, $x_t$] to receive a future input [$h_{t+1}$, $x_{t+1}$], to a forward model 640 to generated a predicted future latent variable embedding vector $ž_{t+1}$. The predicted $ž_{t+1}$ and observed $z_{t+1}$ latent variable embedding vectors are then applied to a forward loss function 650 to generate a forward loss objective function value that can be combined (e.g., by weighted linear combination) to generate an overall loss function value that can be used to update a reinforcement learning agent, the encoder 610, the decoder 620, the forward model 640, or some other aspect of the predictive method 600 and/or used to train a reinforcement learning agent, classifier, predictor, or other machine learning model based on the input.

The first and second aspects or modes of an input used to implement the cross-modal methods as described herein could vary across a variety of applications. For example, the first and second aspects could be haptic and visual inputs, respectively, to a robot. In some examples, the methods described herein could be used to train a virtual agent to implement workflows with respect to incident reports or other text-based records related to the operation of a managed network. For example, the first and second aspects of the input could be "workflow states" and "database states," respectively. In such an example, a user could request a dongle for their laptop. To learn this workflow, the algorithm might have to check if the user is authorized (from a database table) and which laptop the user owns (again, from a database table). In this case, the internal workflow steps "Check user authentication" and "Check user laptop model" should have specific expected responses from the database (i.e. "yes, user is authenticated" and "PADD v2" respectively). An algorithm trained on the cross-model "surprise" objective functions described herein can learn to predict the expected database replies for these states and use this to guide the otherwise hard policy learning. In yet another example, the first and second aspects of the input could be "workflow states" and "user sentiment," respectively. In such an example, certain steps in the workflow may involve human interaction and sentiment can be extracted from the user's response. For example "Will the user be at work tomorrow?" would usually result in a "yes" response from the user but in cases of holiday, sickness, or a variety of other reasons, the response might be negative, leading to a different downstream workflow. An algorithm trained on the cross-model "surprise" objective functions described herein is likely to focus on these cases where the user response is unexpected, as a result being quicker to learn edge cases and quicker to learn a "complete" workflow that is able to address unexpected user behaviors.

The methods described herein, when applied to exploratory reinforcement learning in an environment using both visual and tactile inputs, may be referred to as "Touch-based Curiosity (ToC). ToC includes learning what interactions with visible objects are supposed to "feel" like. Exploration is encouraged by rewarding interactions where the expectation and the experience don't match. In ToC, an initial task-independent exploration phase is followed by an on-task learning phase, in which the original interactions are automatically relabeled with on-task rewards. This approach was tested on a range of touch-intensive robot arm tasks (e.g. pushing objects, opening doors). Across multiple experiments in a simulated setting, these methods were able to learn these difficult tasks through sparse reward and curiosity alone. This approach was also compared to single-modality (touch- or vision-only) approaches as well as other curiosity-based methods, resulting in the observation that the methods described herein performed better and were more sample-efficient.

Many traditional reinforcement learning (RL) agents struggle with sparse-reward problems at least in part due to a lack of exploration. Exploration based on intrinsic curiosity comes naturally to many animals and human babies (who start crawling and exploring the environment at around 9 months). Ideally, we would like our RL agents to explore an environment of interest in an analogous self-guided fashion to learn object properties and use this knowledge to solve downstream tasks.

Curiosity-driven exploration can be implemented, in some examples, through prediction-based surprise. In this formulation, a forward dynamics models predicts the future, and if its prediction is incorrect when compared to the observed future, the agent is surprised and is thus rewarded. This encourages the agent to look for novel states while also improving the forward model. However, this formulation can be practically challenging to train and optimize since there are many states that are dissimilar (e.g., visually dissimilar) but practically irrelevant (e.g. for a pushing task, moving a robotic end effector without touching the object creates visual novelty but contributes little to task-related knowledge). One way to constrain this search space over curious behaviors is by involving another modality like touch.

A self-guided cross-modal exploration policy is described herein that can help solve sparse-reward downstream tasks that existing methods without this curiosity struggle to solve. These methods method use cross-modal consistency (mismatch between visual and touch input signals, or between some other set of different input signals) to guide this exploration. To use self-play knowledge in downstream tasks, these past exploratory experiences were relabeled, providing a dense reward signal that allows modern off-policy RL methods to solve the tasks.

Prior methods that use artificial curiosity/intrinsic motivation often rely either on strong domain knowledge (e.g. labels of state dimensions, a goal-picking strategy) or are prone to getting stuck in local optima when a single meaningless stimulus creates enough surprise to capture the attention of the agent (e.g. a "noisy TV" input). Other approaches rely on unrealistic assumptions and goal conditioning. For example, to make exploration easier, an input state could be recorded in which the objective is already achieved (e.g., the object is already grasped) and then begin half of the training episodes begin from that "success" state. The methods described herein yields better performance on a wide range of robotic manipulation tasks than purely vision-based and touch-based approaches. The tasks assessed include preliminary robotic manipulations such as grasping, pushing, and pulling.

The methods described herein provide a curiosity method to help solve sparse-reward tasks by using cross-modal consistency (predicting one modality from another) to guide exploration. As noted above, the experimental validation of these methods was performed using vision and touch modalities as the inputs, but the formulation of these methods can be applied to other settings. The performance of these methods was assessed in a novel MiniTouch simulation environment that included four downstream tasks. Purely vision-based curiosity approaches and standard off-policy RL algorithms were compared to the improved methods described herein. The methods provided herein improve both performance and sample efficiency.

Intrinsic Motivation: Intrinsic motivation is an inherent spontaneous tendency to be curious or to seek novel inputs in order to further enhance skill and knowledge. This principle is shown to work well even in the absence of a well-defined goal or objective. An example way to generate intrinsic motivation is through the use of "novelty discovery," which can be estimated by state visitation counts. Count-based methods can be extended to high-dimensional state spaces. Alternative forms of intrinsic motivation include disagreement and empowerment. Uniform coverage of the state space can be encouraged by increasing or maximizing entropy of the goal distribution. Reward models can be trained from expert examples to improve learning of instruction conditioned agents.

Exploratory intrinsic motivation can also be achieved through "curiosity." For example, an agent can be guided to learn about the environment dynamics by taking actions that reduce its uncertainty. The approach described herein can be augmented by encouraging an agent to visit states with high predictive errors by training a forward dynamics model that predicts the future state given the current state and action. Instead of making predictions in the raw visual space, input images can be mapped to a lower-dimensional feature space where relevant information is represented via an inverse dynamics model. Random features are sufficient for many popular RL game benchmarks. This approach may work well with tasks that require navigation to find a reward because each unseen position of the agent in the world leads to high intrinsic reward when unseen. However, in the case of manipulative tasks, there is less value in the robot visiting all the possible states than there is in the robot visiting states where the robot interacts with other objects. The methods described herein leverage multimodal inputs to encourage the agent to find novel combinations of visual and tactile (force/torque) modalities. Combining this formulation with the aforementioned forward prediction allows downstream tasks to be solved efficiently.

Self-Supervised Learning via Cross-modality: Multimodal signals are well-suited for self-supervised learning, as information from one modality can be used to supervise learning for another modality. Different modalities typically carry different information, e.g., visual and touch sensory modalities are complementary in nature and concurrent during contact-rich manipulation. Touch is a more local experience and encodes accurate geometrical information, whereas vision is a more global phenomenon. Vision is often not very accurate in detecting and handling shapes and occlusions. Touch can be used to further enhance the details in image based 3D reconstruction and shape recovery.

Multimodal signals can be leveraged to learn representations through vision and language, through vision and audio, or through other pairs of input sensory modalities. In robotics and interactive settings, the use of additional modalities such as tactile sensing or audio can be used to improve outcomes in grasping and manipulation tasks. The methods described herein that use multiple sensory modalities in order to learn better representations can be beneficial in motivating agents to explore.

Markov Decision Process:

To illustrate the methods described herein in the reinforcement learning context, a Markov decision process (MDP) agent was used with state and action spaces denoted by S and A, respectively. For every state $s_t \in S$, the agent performs an action $a_t \in A$, receiving a reward $r_t$. It then transitions to state $s_{t+1}$, following the state transition probability of the environment, $p(s_{t+1}|s_t, a_t)$. Assuming a discount factor of $\gamma \in [0,1]$, the goal of the RL agent is to find a policy that increases or maximizes the expected reward, $\pi^* = \mathbb{E}_\pi[\Sigma_t^\infty \gamma^t r(s_t, a_t)]$. Note that in the sparse reward setting $r_t$ is zero for most of the time steps.

Deep Reinforcement Learning:

The policy $\pi$ can be represented by a neural network or some other model suitable to receive appropriate 'sensory' state inputs, to generate action state outputs, and to be trained using reinforcement learning or some other training method appropriate for the target application and the training data/environment available. In this work, soft actor-critic policy gradients (SAC) were used to train the policies, but in principle, the multi-modal approach described herein is algorithm-agnostic. SAC is an off-policy actor-critic deep reinforcement learning algorithm that increases or maximizes the entropy of the policy along with the cumulative reward. The method alternates between policy evaluation and policy improvement. The policy is evaluated with an estimation of the soft Q-value: $Q(s_t, a_t) \triangleq r(s_t, a_t) + \gamma \mathbb{E}_{s_{t+1} \sim p}[V(s_{t+1})]$; where $V(s_t) = \mathbb{E}_{a_t \sim \pi}[Q(s_t, a_t) - \log \pi(a_t|s_t)]$ is the soft value function.

VI. IMPLEMENTATION OF TOC

Touch-Based Curiosity (ToC) provides a reward signal for an RL agent to explore the state space of task that involves interacting with objects. The exploration phase is independent of the downstream task, i.e. relying solely on visual and force/torque signals, without a reward signal from the downstream task.

On a high level, ToC allows the model to visit under-explored configurations of the state space by encouraging interactions where the system does not know what the target object "feels" like. In other words, actions that surprise the model by failing to predict force/torque signal from visual perception are rewarded. This inter-modal "curiosity" signal can also be applied to other machine learning contexts, even those where the agent/model is being trained from pre-stored training data and not able to "interact" with a system of interest in order to "explore" it. For example, the inter-modal "curiosity" signal used to incentivize exploration by a reinforcement learning agent could, instead, be applied to select or weight training examples, from a library of training examples, that are more likely to be useful in the training of a classifier other trainable machine learning model (e.g., to emphasize more "difficult," "unexpected," or "complex" training examples from a set of training examples that includes a great many training examples that are similar to each other, relatively easy to "solve," or otherwise less useful in training a machine learning model to perform a desired task).

Evoking the observation that humans spend more time exploring stimuli that are more incongruous, ToC enables the agent to focus its experience on different novel cross-modal associations. This intrinsic objective was augmented with a future visual state prediction objective in order to avoid getting stuck in inactive configurations. Note that the future state prediction objective is sometimes referred to herein as the "forward dynamics objective." Note that, while some of the example embodiments described herein are focused on the cross-modality between vision and touch, the concept of cross-modality "curiosity" could be applied to other pairs of sensory domains or other types of inputs, like vision and acoustics, touch and acoustics, bibliographical data about incident reports and textual data from incident reports, etc.

A. Cross-Modal Prediction

An example motivational model consists of two modules: (i) the touch prediction model, which learns to predict expected haptic sensation from the visual input, and (ii) the forward dynamics model, which predicts the next latent state from the current latent state and the current action. This motivational model is depicted in FIG. 6. Let the state of the environment $s_t=(x_t, h_t)$ at time t be composed of a visual signal $x_t$ and a haptic signal $h_t$, and let $z_t$ be the latent state (the visual input as encoded by an encoder 610). The touch prediction model consists of a convolutional encoder 620 $z_t=\text{enc}(x_t)$ that transforms the image $x_t$ into a latent representation $z_t$. The touch prediction module also includes a fully-connected decoder 620 $\hat{h}_t=\text{dec}(z_t)$ that transforms the latent representation of the visual signal into a predicted haptic signal $\hat{h}_t$. The encoder-decoder can be trained based on an intermodal loss 630 calculated based on the predicted and observed haptic signals. For example, an L2 reconstruction loss could be used, e.g., for every image $x_t$ and force/torque sensor $h_t$: $L_{touch}=\|\hat{h}_t-h_t\|_2$.

A high prediction error on a given image indicates that the agent has had few interactions like this. Therefore, to harness this "surprise" to guide exploration, the intrinsic reward at time t during exploration can be defined as proportional to this intermodal reconstruction loss.

B. Regularization Through Forward Dynamics Model

The goal of ToC was to encourage the agent to interact with objects. It was observed empirically (and demonstrated in the experiments described below) that the "surprise" stemming from haptic novelty was sometimes insufficient to cause object-centric interaction. Classic visual surprise (i.e. the mismatch between predicted forward dynamics and observed dynamics) was added to the inter-modal "surprise" above to create an agent that seeks out visual novelty as well as haptic novelty (as represented by "surprise" at the experienced haptic input in view of the corresponding visual input), thus resulting in better state space coverage during the exploration phase of reinforcement learning. To this end, the model was augmented with a forward dynamics model 640 $\check{z}_{t+1}=\text{fdm}(z_t, a_t)$ that learns to map the latent state $z_t$ (obtained from the visual encoder 610) and action at $a_t$ time t to the predicted latent visual state $\check{z}_{t+1}$ at the next time step. This model can be trained on an forward prediction loss 650 calculated based on the predicted and observed visual state $\check{z}_{t+1}$ at the next time step. For example, an L2 loss could be used, e.g.,: $L_{fdm}=\|\check{z}_{t+1}-z_{t+1}\|_2=\|\text{fdm}(\text{enc}(x_t), a_t)-\text{enc}(x_{t+1})\|_2$.

The intrinsic reward was defined as the convex combination of the cross-modal prediction loss and the forward dynamics model loss: $r_t=(1-\lambda)\cdot L_{touch}+\lambda\cdot L_{fdm}$ where $\lambda \in [0,1]$ is a balancing factor. The effect of the factor A on overall performance is outlined in the ablation experiments described below.

C. Training

Learning was divided into two stages: (i) an exploratory step, where the agent performs free exploration following ToC, and (ii) an adaptation step, where the agent is tasked to solve a downstream problem, given a sparse reward.

During the exploratory step, each trajectory consisted of pairs of images and force/torque features, $(x_1;h_1)$; $(x_2;h_2), \ldots, (x_n;h_n)$. These trajectories were used for two purposes: (i) updating the parameters of the prediction model and (ii) updating the exploration policy based on the intrinsic reward $r_t$. For vision-based curiosity models, a random network constitutes a simple and effective strategy compared to learned features. The performance of this model in both the scenarios i.e. when the features are learned vs random is described experimentally below. The overall optimization problem at this step consisted of the policy learning (driven by intrinsic reward), the touch reconstruction loss, and the forward dynamics loss. That is, $$\min_\theta \ [-\mathbb{E}_\pi[\Sigma_t r_t] + L_{touch} + L_{fdm}],$$

where θ are the parameters of the networks.

During the downstream adaptation step, the parameters of the policy network, the Q network and the replay buffer were retained from the exploratory phase. The objective of the downstream task is computed as:

$$\min_\theta \ [-\mathbb{E}_\pi[\Sigma_t r_t^e]],$$

where $r_t^e$ in this phase was a task-specific external sparse reward. Notice that θ here is same as above, during the exploratory step. In both steps, the objectives were optimized with Adam.

D. Results of ToC Implementation

Robot-hand manipulation tasks in complex environments have previously relied extensively on domain knowledge or hand-engineered rewards. Borrowing insights from how infants learn to explore out of curiosity by touching what they visually perceive, Touch-based Curiosity (ToC) aids RL algorithms to address manipulation-based tasks with sparse rewards. The addition of additional modalities, using the inter-modal "curiosity" signal described above, improves the performance of these systems on downstream tasks. This technique can be combined with an arbitrary off-policy RL algorithm and is effective with SAC. Increased interaction with target objects and improved downstream performance in simulated domains were observed (see, e.g., the experimental results described below).

VII. EXAMPLE OPERATIONS

Figure 7:
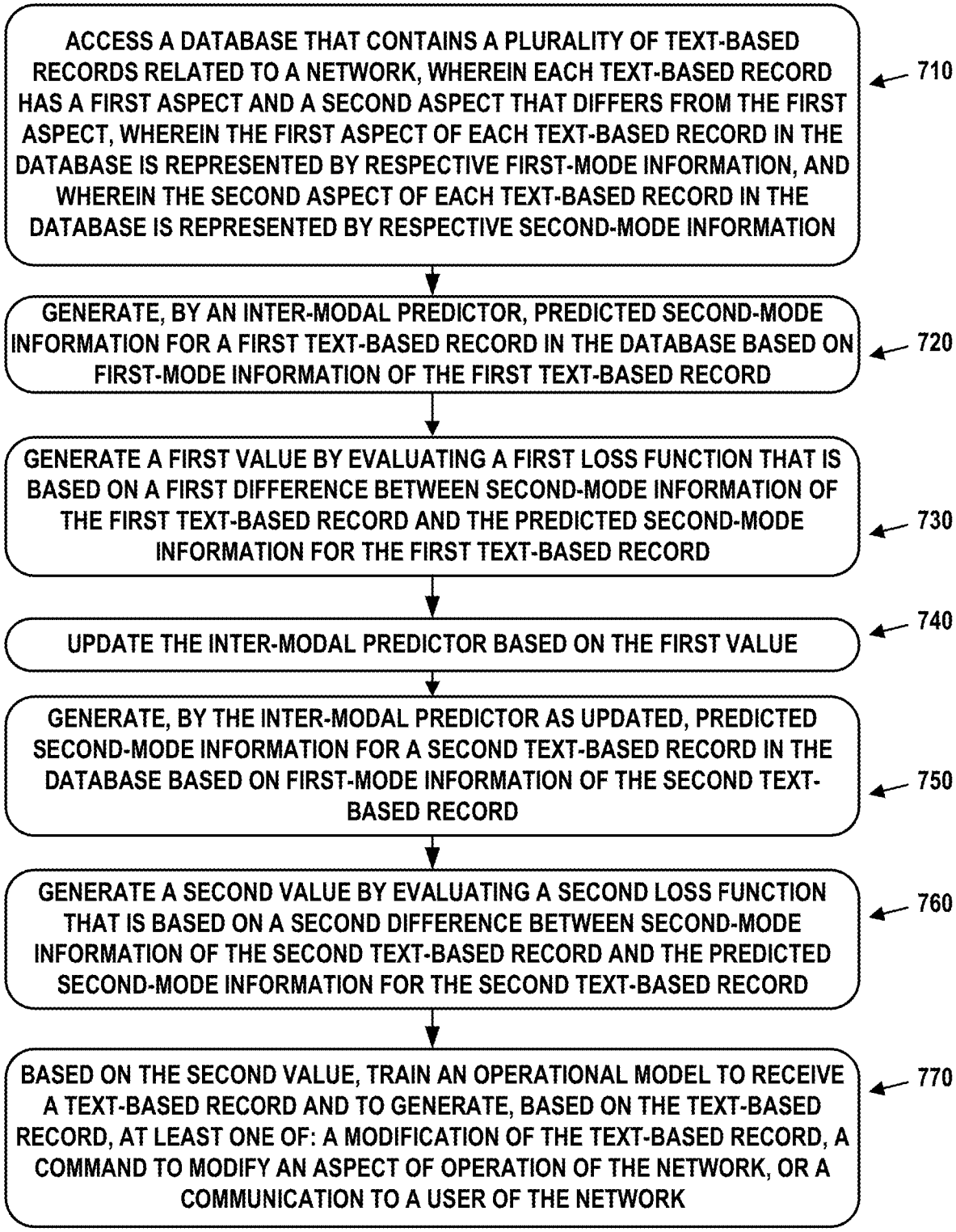
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by computational instance of a remote network management platform.

The embodiments of FIG. 7 may be simplified by the removal of any one or more of the features shown therein. Further, these embodiments may be combined with features, aspects, and/or implementations of any of the previous figures or otherwise described herein.

In the example embodiment of FIG. 7, persistent storage (e.g., a database) exists that contains a plurality of text-based records related to operation of a network (e.g., a managed network). Such a network can be associated with a computational instance that includes one or more processors configured to perform elements of the example embodiment of FIG. 7. Each text-based record of the plurality of text-based records has a first aspect and a second aspect that differs from the first aspect. The first aspect of each text-based record in the database is represented by respective first-mode information and the second aspect of each text-based record in the database is represented by respective second-mode information.

The example embodiment of FIG. 7 includes accessing a database that contains the plurality of text-based records related to the network (710). The example embodiment of FIG. 7 additionally includes generating, by an inter-modal predictor, predicted second-mode information for a first text-based record in the database based on first-mode information of the first text-based record (720). The example embodiment of FIG. 7 also includes generating a first value by evaluating a first loss function that is based on a first difference between second-mode information of the first text-based record and the predicted second-mode information for the first text-based record (730). The example embodiment of FIG. 7 also includes updating the inter-modal predictor based on the first value (740). The example embodiment of FIG. 7 also includes generating, by the inter-modal predictor as updated, predicted second-mode information for a second text-based record in the database based on first-mode information of the second text-based record (750). The example embodiment of FIG. 7 also includes generating a second value by evaluating a second loss function that is based on a second difference between second-mode information of the second text-based record and the predicted second-mode information for the second text-based record (760). The example embodiment of FIG. 7 also includes, based on the second value, training an operational model to receive a text-based record and to generate, based on the text-based record, at least one of: a modification of the text-based record, a command to modify an aspect of operation of the network, or a communication to a user of the network (770). The example embodiment of FIG. 7 could include additional or alternative steps or elements.

In some embodiments, training the operational model based on the second value comprises at least one of (i) selecting the second text-based record to be used as part of a training set of the plurality of text-based records used to train the operational model, or (ii) using the second value to weight a degree to which contents of the second text-based record are used to train the operational model.

In some embodiments, at least one of the first aspect or the second aspect comprises at least one of a workflow status of a text-based record, an association of the text-based record with a technician, an association of the text-based record with a user, an association of the text-based record with a technical problem, an association of the text-based record with a technical solution, an association of the text-based record with hardware, or an association of the text-based record with software.

In some embodiments, the modification of the text-based record comprises a modification of at least one of a workflow state of the text-based record, an association of the text-based record with a technician, an association of the text-based record with a user, an association of the text-based record with a technical problem, an association of the text-based record with a technical solution, an association of the text-based record with hardware, or an association of the text-based record with software.

In some embodiments, the command to modify an aspect of operation of the network comprises a command to modify at least one of an authorization status of the user, an organizational status of the user, an identity or status of hardware associated with the user, or an identity or status of software associated with the user.

In some embodiments, the communication to the user of the network comprises a query related to at least one of a task having been performed by the user or a status of hardware or software associated with the user.

In some embodiments, the operational model comprises a virtual agent configured to receive as input a text-based record and to output a communication to a user associated with the text-based record. These embodiments further comprise: generating, by the virtual agent receiving a third text-based record in the database, a first communication to a first user associated with the third text-based record; based on the first communication and the plurality of text-based records, simulating a fourth text-based record that includes a simulated response of the first user to the first communication and that includes first-mode information that represents the first aspect of the fourth text-based record and second-mode information that represents the second aspect of the fourth text-based record; generating, by the inter-modal predictor as updated, predicted second-mode information for the fourth text-based record based on first-mode information of the fourth text-based record; generating a third value by evaluating a third loss function that is based on a third difference between second-mode information of the fourth text-based record and the predicted second-mode information for the fourth text-based record; and based on the third value, updating the inter-modal predictor and the virtual agent.

Some embodiments further comprise: generating predicted first-mode information for the fourth text-based record by applying the first-mode information for the third text-based record and the first communication to a forward model, wherein generating the third value comprises evaluating a fourth loss function that is based on (i) the third difference between second-mode information of the fourth text-based record and the predicted second-mode information for the fourth text-based record, and (ii) a difference between the first-mode information of the fourth text-based record as simulated and as predicted.

Some embodiments further comprise: receiving an additional text-based record; generating, by the virtual agent as updated receiving the additional text-based record, a second communication to an additional user associated with the additional text-based record; and transmitting, to the additional user, an indication of the second communication.

Figure 8:
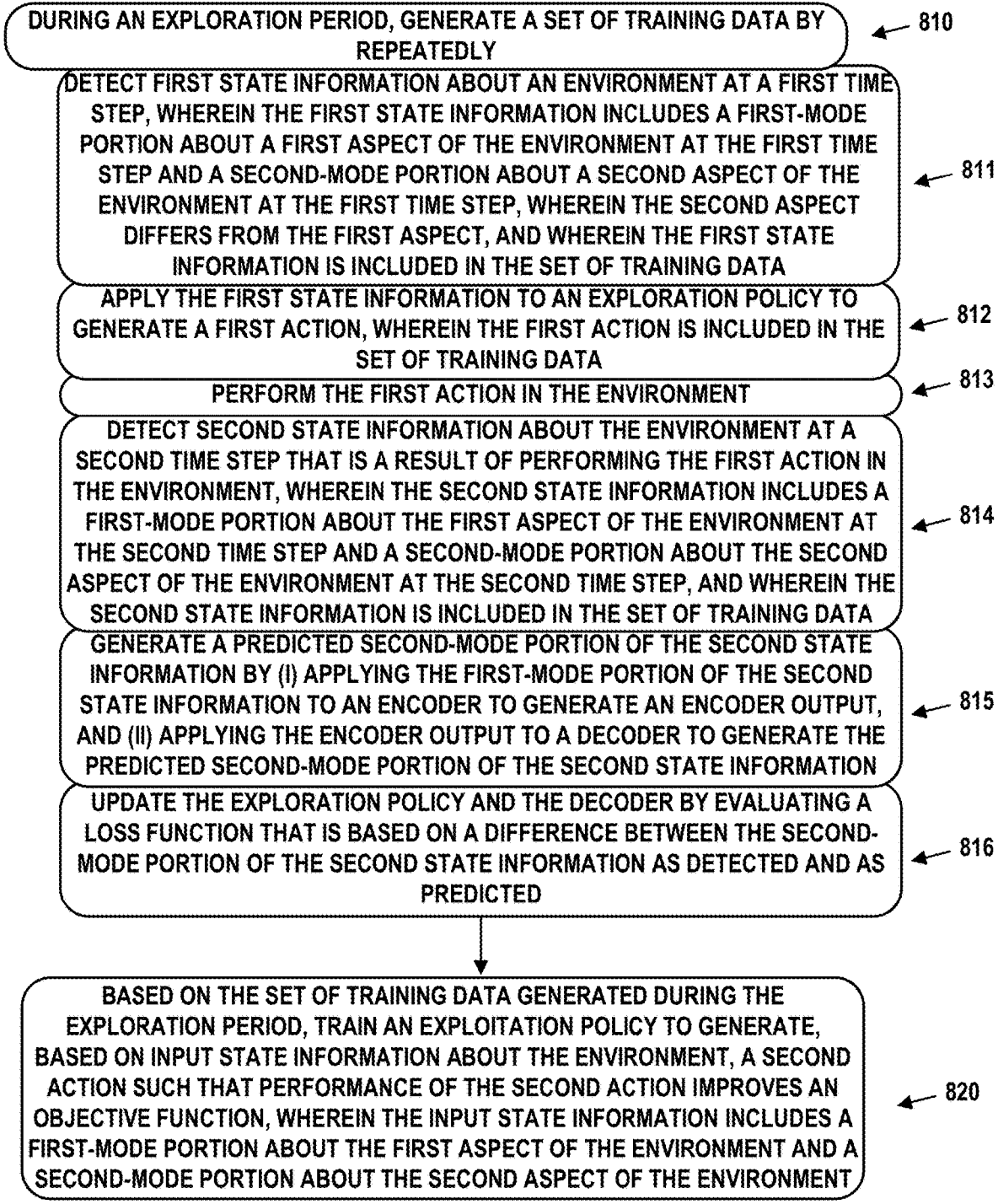
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by computational instance of a remote network management platform.

The embodiments of FIG. 8 may be simplified by the removal of any one or more of the features shown therein. Further, these embodiments may be combined with features, aspects, and/or implementations of any of the previous figures or otherwise described herein.

The example embodiment of FIG. 8 includes, during an exploration period, generating a set of training data (810) by repeatedly: (i) detecting first state information about an environment at a first time step, wherein the first state information includes a first-mode portion about a first aspect of the environment at the first time step and a second-mode portion about a second aspect of the environment at the first time step, wherein the second aspect differs from the first aspect, and wherein the first state information is included in the set of training data (811); (ii) applying the first state information to an exploration policy to generate a first action, wherein the first action is included in the set of training data (812); (iii) performing the first action in the environment (813); (iv) detecting second state information about the environment at a second time step that is a result of performing the first action in the environment, wherein the second state information includes a first-mode portion about the first aspect of the environment at the second time step and a second-mode portion about the second aspect of the environment at the second time step, and wherein the second state information is included in the set of training data (814); (v) generating a predicted second-mode portion of the second state information by (a) applying the first-mode portion of the second state information to an encoder to generate an encoder output, and (b) applying the encoder output to a decoder to generate the predicted second-mode portion of the second state information (815); and (vi) updating the exploration policy and the decoder by evaluating a loss function that is based on a difference between the second-mode portion of the second state information as detected and as predicted (816).

The example embodiment of FIG. 8 yet further includes, based on the set of training data generated during the exploration period, training an exploitation policy to generate, based on input state information about the environment, a second action such that performance of the second action improves an objective function, wherein the input state information includes a first-mode portion about the first aspect of the environment and a second-mode portion about the second aspect of the environment (820).

The example embodiment of FIG. 8 could include additional or alternative steps or elements.

In some embodiments, the first-mode portions of the first and second state information comprise visual information about the environment and wherein the second-mode portions of the first and second state information comprise haptic information about the environment.

Some embodiments further comprise: generating a predicted first-mode portion of the second state information by applying the encoder output and the first action to a forward model to generate a predicted n encoder output, wherein updating the exploration policy and the decoder by evaluating the loss function comprises evaluating a further loss function that is based on (i) the difference between the second-mode portion of the second state information as detected and as predicted, and (ii) a difference between the first-mode portion of the second state information as detected and as predicted.

Some embodiments further comprise: generating the encoder randomly or pseudo-randomly.

Some embodiments further comprise: updating the encoder based on the loss function.

In some embodiments, the first-mode portion and second-mode portion of the first and second state information comprise information about respective different aspects of incident reports related to a network.

In some embodiments, the first-mode portion and second-mode portion of the first state information comprises information about one or more requests received from a user of a network, and wherein the first action specified a communication to the user in response to the one or more requests.

Some embodiments further comprise: generating the first state information and second state information by simulating operation of the network and action of the user based on the first action and a database that contains a plurality of text-based records related to the network.

In some embodiments, the second-mode portion of the first state information depicts at least one of an authorization status of the user, a name of the user, an organizational status of the user, an identity or status of hardware associated with the user, or an identity or status of software associated with the user.

VIII. EXPERIMENTAL RESULTS

Experimental investigation of these methods was performed for a tabletop robot manipulation task based on raw image observations and raw force/torque sensory values which were referred to as a "touch vector." For these experiments, a 7-DoF Franka Emika Panda arm with a two-finger parallel gripper was used. Each of the fingers was equipped with a simulated force/torque sensor that measured the joint reaction force applied to it. PyBullet was used to simulate the robot arm and haptic sensor.

State Space: The input states to the model were a combination of visual and touch vector input. The visual input is a grayscale rendering of the scene with dimension 84 by 84. Image observations were captured from a static camera overlooking each scene. The touch vector input is composed of the 3-dimensional end-effector position, 2-dimensional finger position, ranging from 0 to 1, each denoting how far apart each finger is, and the 6-dimensional force/torque values. In total, the touch vector is 11-dimensional, $S \in R^{11}$.

Action Space: Actions output from the model were expressed as 4-dimensional continuous vectors. The first three elements describe the desired offset for the end effector at the next time step based on its current position. The last dimension controls the relative desired distance between the two fingers at the next time step.

Implementation Details: The ToC reconstruction model included a visual encoder network and a touch decoder network. The encoder was a four-layered strided convolutional neural network followed by a fully connected network. LeakyReLU unites were used as non-linear activation functions in all the layers. The decoder network was a two-layered MLP that maps 256-dimensional visual features to a touch vector.

A. MiniTouch Benchmark

A novel benchmark task, MiniTouch, was generated to assess the methods described herein and/or other methods for training a controller to perform an interaction task. The MiniTouch benchmark includes four manipulation tasks. The tasks are not based on a proprietary simulator and feature an arm that is equipped with a haptic sensor.

B. Tasks

Playing: This environment is intended as toy task to evaluate interaction frequency and does not feature any reward beyond interaction count. A cube is placed in a random position on a table at each episode. The agent needs to localize and interact with the cube.

Pushing: In this task, the agent needs to push an object placed randomly on a table to a target (visually indicated as gray cube). The object position was sampled uniformly in polar coordinates around the target object (i.e. angle 0 to 360 degrees, distance 10 to 20 centimeters). The end effector's start position was sampled in the same way as the target position. The robot agent succeeds and receives a reward of +25 if the distance between the cube and the target object is less than 7 centimeters. A new episode starts if the agent succeeds.

Opening: A cabinet with a door was randomly placed in reach of the agent with the goal of finding the door handle, and opening the door. The gripper orientation was fixed to point its fingers towards the door, parallel to the ground. For this task, the fingers were discretized to be open or closed. In addition, a fifth element was added to the action vector to control the yaw (relative rotation of the end-effector) to be able to approach the door. The robot succeeds and receives a reward of +25 when the angle of the door opening reaches thirty degrees or more. Similar to the pushing task, a new episode starts if the agent reaches the goal.

Pick-up: In this environment, the agent needs to grasp and lift a randomly placed object. The agent's goal was to lift the object 5 cm above the table. The agent receives a reward of +25 upon success. The object was placed uniformly randomly on a table. Similarly to the Opening task, the end effector opening/closing was discretized, meaning when its internal continuous variable is below a threshold, the gripper closes, otherwise it remains open.

C. Baseline Methods

Two versions of the model were assessed: (i) ToC-partial, including only the force/torque reconstruction intrinsic reward, and (ii) ToC considering the full intrinsic reward (i.e., the visual-to-haptic prediction reward and the forward prediction reward). The reward models were compared with three baselines:

SAC: The unmodified Soft Actor-Critic algorithm from Haarnoj a et al.

ICM: SAC augmented with the state-of-the-art visual curiosity approach ICM, which uses a visual forward model to guide exploration.

Disagreement: A disagreement-based curiosity formulation, which uses model disagreement as an objective for exploration. This approach uses variance in the prediction of an ensemble of multiple latent dynamics models as the intrinsic reward.

A Pytorch version of these baselines was implemented based on available Tensorflow open source code.

D. Evaluation Metrics

Exploration success: measures the percentage of times that the agent attained the goal state in the exploratory phase, i.e. with no external reward. Higher is better.

Success: denotes the percentage of times that the agent attained the goal state during the down-stream task phase.

Episode steps: quantifies the number of steps required for each episode to succeed. This metric is an indicator of the sample efficiency. The lesser the number of steps, the faster the agent's ability to succeed.

Touch-interaction: measures the amount of interaction the agent's fingers had with the underlying object. This metric was obtained by computing the variance of the force/torque sensory signal across the whole episode when the end-effector interacted with the object. Higher variance indicates better interaction.

Object-movement: in addition to touch-interaction, the variance of door angle (for the opening task) and the variance of object position (for the remaining tasks) were computed over the course of training. Higher value indicates dynamic movement of the object. Higher touch-interaction need not indicate better object-movement. Agents can resort to constantly engaging with the object in a passive manner.

E. Data from Experiments

ToC and baselines were trained on a Panda robot agent for one million steps. In the exploratory phase of the training, the methods described herein were pre-trained only with the curiosity-based intrinsic reward. The down-stream tasks phase occurred subsequently.

The effect on performance of training for different amounts of exploratory episodes was analyzed. Note that across all tasks, ToC includes forward prediction reward in addition to the ToC-partial.

Figure 9A:
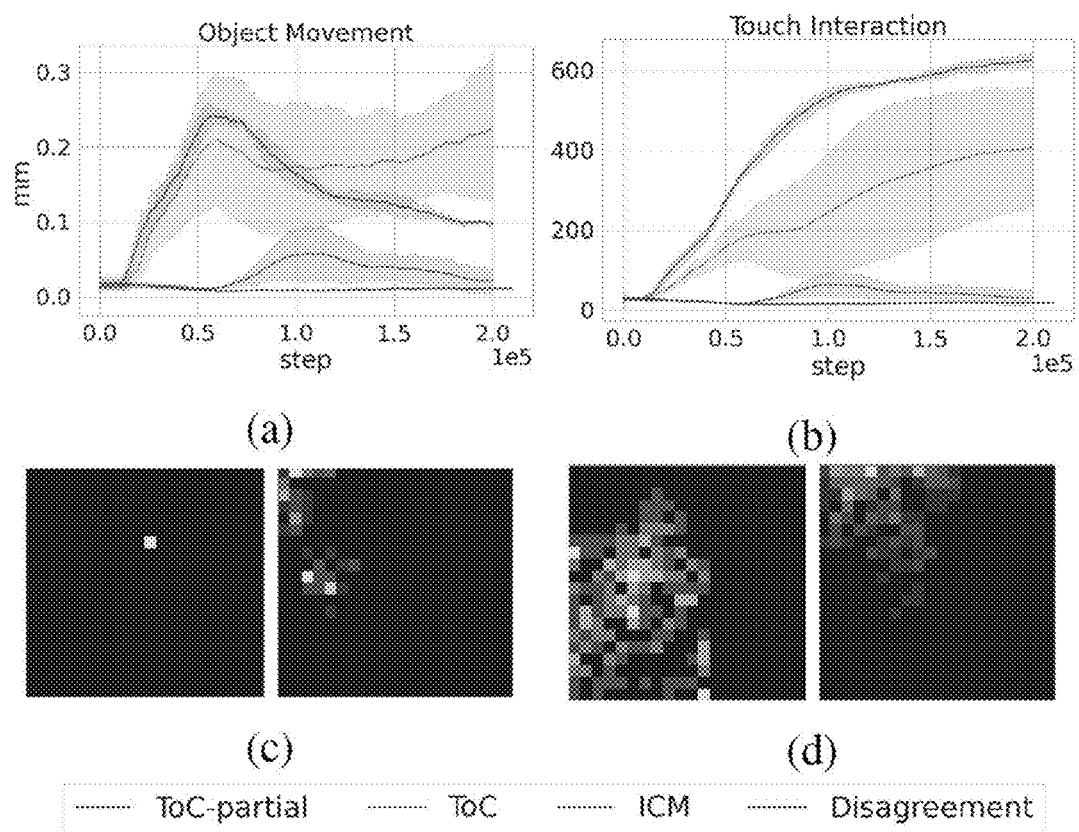
FIG. 9A depicts experimental results, in accordance with example embodiments.

FIG. 9A shows results from the basic task of 'playing' with a single object. Since single object 'playing' did not have explicit goal states to evaluate, the model's ability to constantly engage and 'play' with the underlying object was evaluated. ToC-partial displays four times better interaction with underlying object when compared to SAC. The Touch interaction plot in part (b) of FIG. 9A suggests that there is a constant interaction with the object. Also, the plot depicting object movement metric in in FIG. 9A(a) indicates that ToC is more dynamic in the interaction in contrast to ToC-partial. Note from the plots that there is a trade-off when using ToC-partial and ToC between constant interaction (i.e. touch interaction performance) and object movement dynamics. Although ToC has lesser touch-interaction than ToC-partial in part (b) of FIG. 9A, it is able to collect more interesting data by being aggressive such that object is moved in a more interesting fashion during the exploratory phase as shown in part (a) of FIG. 9A. Collecting a variety of such interesting data helps the agent in terms of sample efficiency while solving the downstream tasks.

Figure 9B:
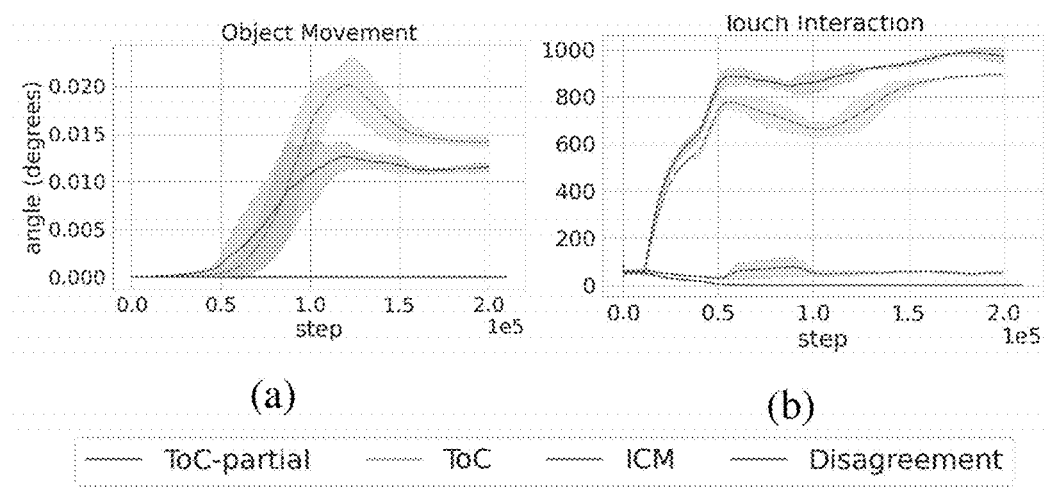
FIG. 9B depicts experimental results, in accordance with example embodiments.

FIG. 9B shows similar plots for the door opening task. Unlike 'playing,' object movement for opening tasks is computed as variance of door angle (measured in degrees) as afore-mentioned. ToC and ToC-partial were also compared with SAC and state-of-the-art vision based curiosity baselines on the remaining downstream tasks in MiniTouch. From FIG. 9C it is evident that ToC and ToC-partial are considerably better than SAC in all the tasks and better than the vision-based curiosity models in the majority of the tasks. Using SAC alone hinders the performance and is often unable to solve any of the three tasks. This is not surprising since the model is not motivated enough to collect diverse and useful data through interaction. ICM makes better progress than ToC-partial in the pushing task, however, ToC dominates in performance by about 15%. Recall that the goal is not just to succeed but to help agents attain success in a sample-efficient manner in fewer iterations or steps. The results support the hypothesis that cross-modal curiosity enables agents to succeed at a very early stage in training and often without any external reward.

F. Ablation Studies

Figure 9C:
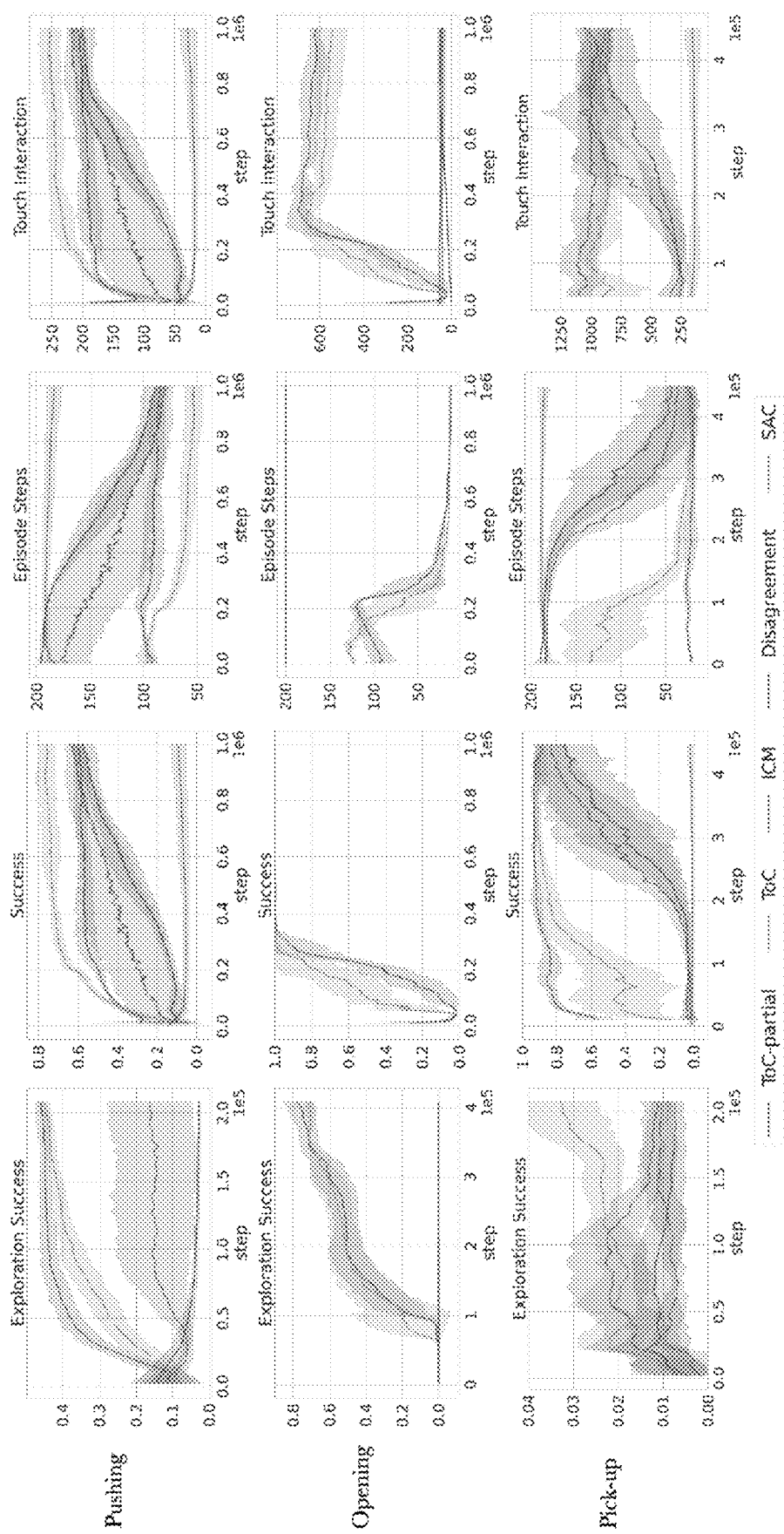
FIG. 9C depicts experimental results, in accordance with example embodiments.
Figure 9D:
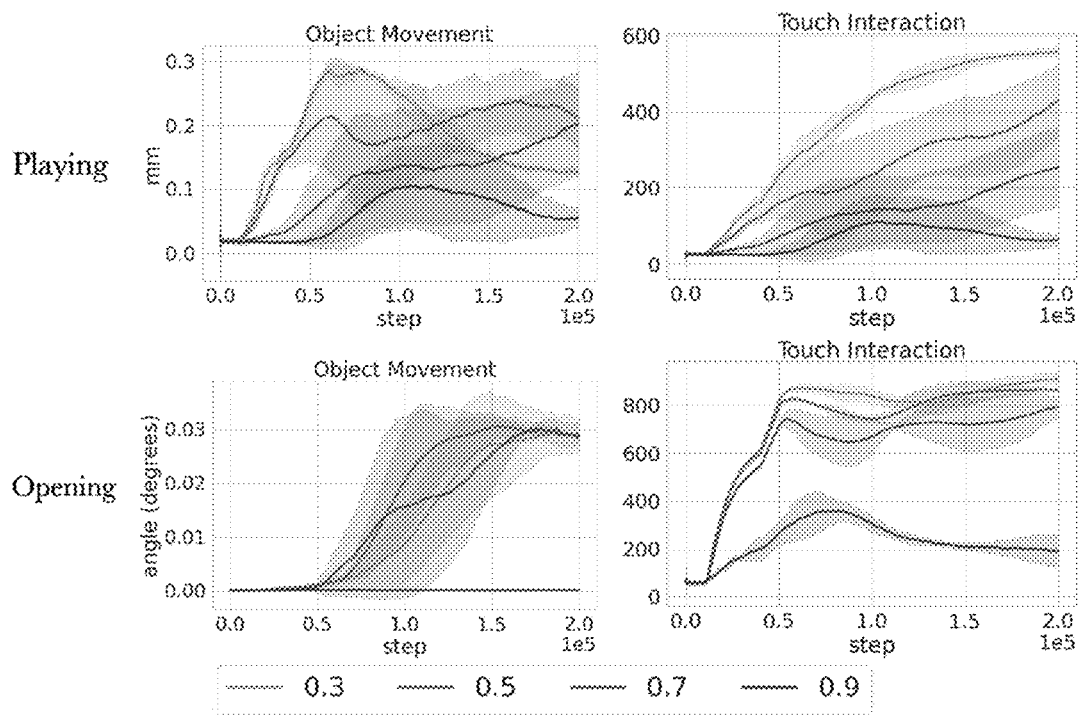
FIG. 9D depicts experimental results, in accordance with example embodiments.

Importance of forward objective: The visual forward prediction $L_{fdm}$ plays a handy role when it is used appropriately in and the right proportion. Intrinsic reward is a weighted combination of cross-modal prediction and forward prediction. FIG. 9D illustrates the performance of the model with different levels of emphasis on the forward loss term, the relative weighting uniformly sampled between 0 and 1. Higher weights indicate that the future prediction dominates force/torque prediction. Note that both larger and smaller values diminish the overall performance. Larger weight leads to more object movement but hurts agent's constant touch-interaction with the underlying objects, while smaller weight leads to inactive behavior while satisfying the objective as shown in the FIG. 9D.

Figure 9E:
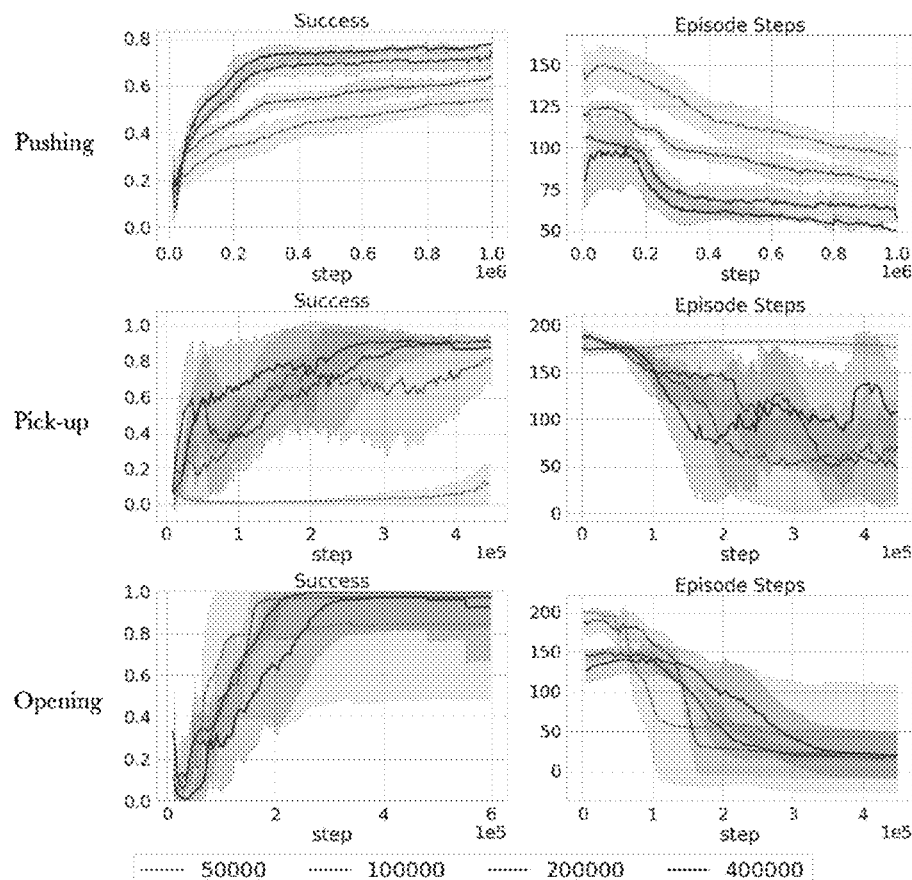
FIG. 9E depicts experimental results, in accordance with example embodiments.

Longer exploration: It was observed that having a longer exploratory phase of training with intrinsic reward alone usually benefitted the overall performance. As shown in FIG. 9C, ToC attains decent success in the exploratory phase without any external reward on most of the tasks. This is because it encourages better associations and larger collections of interesting configurations in the replay. The effect of the exploratory step was further studied and the results on all of the downstream tasks with different durations of exploration is compiled in FIG. 9E, which depicts, among other things, the episode convergence steps and success rate to visualize the trend.

Figure 9F:
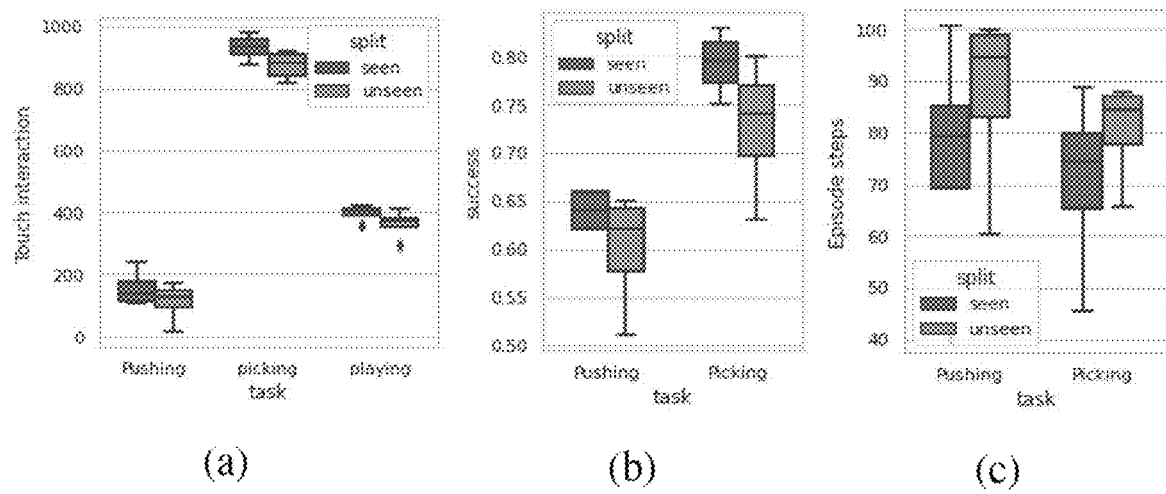
FIG. 9F depicts experimental results, in accordance with example embodiments.

Robustness to diverse shapes: The aim of this ablation was to investigate whether ToC generalizes while interacting with objects that has not been seen during training. It is desirable for an agent to be able to handle diverse shapes in order to be robust across arbitrary manipulation settings. To investigate this, an environment was used in which an object was sampled from a thousand procedurally generated objects. The objects were dissimilar with respect to shape and mass but sampled from the same generative distribution. Out of 1000 different objects, 800 of them are used in the training phase and in between the training episodes the agent's effectiveness on the remaining 200 unseen object shapes was also evaluated. FIG. 9F shows touch interaction and object movement evaluations for a single object exploration task. The results validate that the model described herein adapts and relates to unseen object configurations.

Touch-based future prediction: The goal of this experiment was to strengthen the argument of cross-modal association. While conducting experiments, it can be beneficial to deduce information of one modality from another modality in a related manner, rather than simply adding another modality on top of visual information. An additional touch-based baseline, ToC-future, was created where, in addition to the visual future prediction model, a touch-based future prediction model was added. The touch-based future prediction model takes a touch vector as input and predicts the touch vector for the next time step. The table below compares ToC and ToC-future on MiniTouch tasks and shows that ToC-future is better than ICM in general but compares below ToC.

Figure 9G:
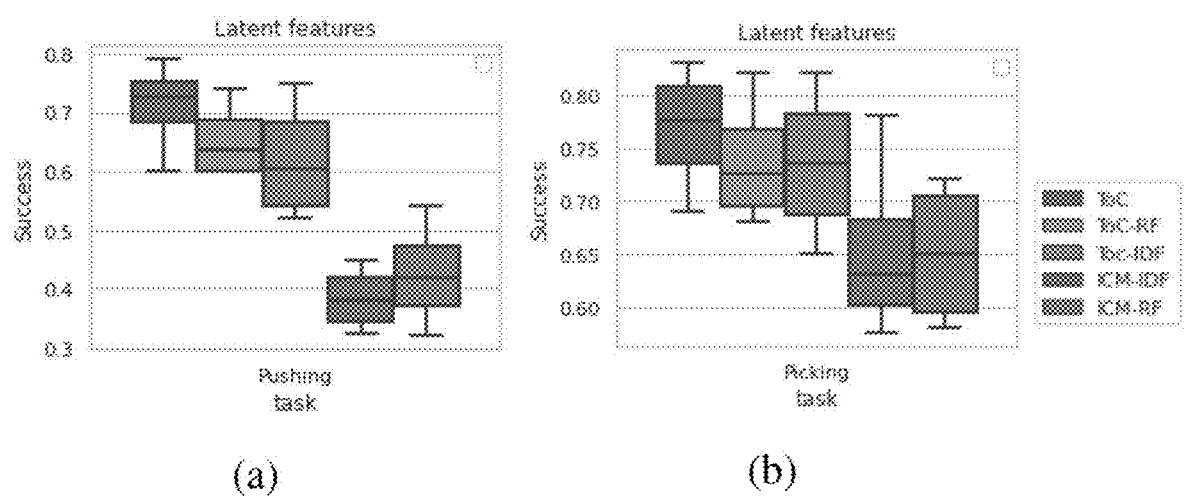
FIG. 9G depicts experimental results, in accordance with example embodiments.

Latent features for forward dynamics: Choosing an ideal embedding space for decoding the touch vector and for predicting the future state is important. Some existing approaches rely on a pretext inverse dynamics task of predicting the agent's action given its current and next states. Another simple yet strong method is to use features from a random but fixed initialization of the encoder (e.g., encoder 610). In this work, the features were learned by leveraging a self-supervised pretext task of predicting one modality from the other. FIG. 9G compares (1) an encoder learned through cross-modal prediction (ToC), (2) a random feature encoder (ToC-RF), and (3) an encoder learned through an IDF task (ToC-IDF). In each case, the decoder network was optimized through touch prediction. The random features variant was stable and effective on both ToC and ICM models.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be

|  | Pushing | | | Open Door | | | Pick-up | | | Playing | | |
|---|---|---|---|---|---|---|---|---|---|---|---|---|
|  | ToC | ToC-fut | ICM | ToC | ToC-fut | ICM | ToC | ToC-fut | ICM | ToC | ToC-fut | ICM |
| Exploration ↑ | 0.403 | 0.291 | 0.187 | 0.669 | 0.355 | 0.083 | 0.063 | 0.051 | 0.013 | — | — | — |
| Success ↑ | 0.733 | 0.678 | 0.597 | 0.983 | 0.571 | 0.114 | 0.891 | 0.825 | 0.780 | — | — | — |
| Episode steps ↓ | 57.84 | 87.61 | 95.24 | 23.34 | 97.10 | 199.3 | 30.54 | 33.77 | 42.19 | — | — | — |
| Touch-interaction ↑ | 247.79 | 210.11 | 202.66 | 600.1 | 287.97 | 43.56 | 980.7 | 984.2 | 952.3 | 388.15 | 267.021 | 63.31 | stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
accessing a database that contains a plurality of text-based records related to a network, wherein each text-based record has a first aspect and a second aspect that differs from the first aspect, wherein the first aspect of each text-based record in the database is represented by respective first-mode information, and wherein the second aspect of each text-based record in the database is represented by respective second-mode information;
generating, by an inter-modal predictor, predicted second-mode information for a first text-based record in the database based on first-mode information of the first text-based record;
generating a first value by evaluating a first loss function that is based on a first difference between second-mode information of the first text-based record and the predicted second-mode information for the first text-based record;
updating the inter-modal predictor based on the first value;
generating, by the inter-modal predictor as updated, predicted second-mode information for a second text-based record in the database based on first-mode information of the second text-based record;
generating a second value by evaluating a second loss function that is based on a second difference between second-mode information of the second text-based record and the predicted second-mode information for the second text-based record; and
based on the second value, training an operational model to receive a text-based record and to generate, based on the text-based record, at least one of: a modification of the text-based record, a command to modify an aspect of operation of the network, or a communication to a user of the network.

2. The computer-implemented method of claim 1, wherein training the operational model based on the second value comprises at least one of (i) selecting the second text-based record to be used as part of a training set of the plurality of text-based records used to train the operational model, or (ii) using the second value to weight a degree to which contents of the second text-based record are used to train the operational model.

3. The computer-implemented method of claim 1, at least one of the first aspect or the second aspect comprises at least one of a workflow status of a text-based record, an association of the text-based record with a technician, an association of the text-based record with a user, an association of the text-based record with a technical problem, an association of the text-based record with a technical solution, an association of the text-based record with hardware, or an association of the text-based record with software.

4. The computer-implemented method of claim 1, wherein the modification of the text-based record comprises a modification of at least one of a workflow state of the text-based record, an association of the text-based record with a technician, an association of the text-based record with a user, an association of the text-based record with a technical problem, an association of the text-based record with a technical solution, an association of the text-based record with hardware, or an association of the text-based record with software.

5. The computer-implemented method of claim 1, wherein the command to modify an aspect of operation of the network comprises a command to modify at least one of an authorization status of the user, an organizational status of the user, an identity or status of hardware associated with the user, or an identity or status of software associated with the user.

6. The computer-implemented method of claim 1, wherein the communication to the user of the network comprises a query related to at least one of a task having been performed by the user or a status of hardware or software associated with the user.

7. The computer-implemented method of claim 1, wherein the operational model comprises a virtual agent configured to receive as input a text-based record and to output a communication to a user associated with the text-based record, and wherein the method further comprises:
generating, by the virtual agent receiving a third text-based record in the database, a first communication to a first user associated with the third text-based record;
based on the first communication and the plurality of text-based records, simulating a fourth text-based record that includes a simulated response of the first user to the first communication and that includes first-mode information that represents the first aspect of the fourth text-based record and second-mode information that represents the second aspect of the fourth text-based record;
generating, by the inter-modal predictor as updated, predicted second-mode information for the fourth text-based record based on first-mode information of the fourth text-based record;

generating a third value by evaluating a third loss function that is based on a third difference between second-mode information of the fourth text-based record and the predicted second-mode information for the fourth text-based record; and based on the third value, updating the inter-modal predictor and the virtual agent.

8. The computer-implemented method of claim 7, further comprising:

generating predicted first-mode information for the fourth text-based record by applying the first-mode information for the third text-based record and the first communication to a forward model, wherein generating the third value comprises evaluating a fourth loss function that is based on (i) the third difference between second-mode information of the fourth text-based record and the predicted second-mode information for the fourth text-based record, and (ii) a difference between the first-mode information of the fourth text-based record as simulated and as predicted.

9. The computer-implemented method of claim 7, further comprising:

receiving an additional text-based record;

generating, by the virtual agent as updated receiving the additional text-based record, a second communication to an additional user associated with the additional text-based record; and transmitting, to the additional user, an indication of the second communication.

10. An article of manufacture including a non-transitory computer-readable medium, having stored thereon program instructions that, upon execution by a computing device, cause the computing device to perform operations comprising:

accessing a database that contains a plurality of text-based records related to a network, wherein each text-based record has a first aspect and a second aspect that differs from the first aspect, wherein the first aspect of each text-based record in the database is represented by respective first-mode information, and wherein the second aspect of each text-based record in the database is represented by respective second-mode information;

generating, by an inter-modal predictor, predicted second-mode information for a first text-based record in the database based on first-mode information of the first text-based record;

generating a first value by evaluating a first loss function that is based on a first difference between second-mode information of the first text-based record and the predicted second-mode information for the first text-based record;

updating the inter-modal predictor based on the first value;

generating, by the inter-modal predictor as updated, predicted second-mode information for a second text-based record in the database based on first-mode information of the second text-based record;

generating a second value by evaluating a second loss function that is based on a second difference between second-mode information of the second text-based record and the predicted second-mode information for the second text-based record; and based on the second value, training an operational model to receive a text-based record and to generate, based on the text-based record, at least one of: a modification of the text-based record, a command to modify an aspect of operation of the network, or a communication to a user of the network.

11. The article of manufacture of claim 10, wherein training the operational model based on the second value comprises at least one of (i) selecting the second text-based record to be used as part of a training set of the plurality of text-based records used to train the operational model, or (ii) using the second value to weight a degree to which contents of the second text-based record are used to train the operational model.

12. A computer-implemented method comprising:

during an exploration period, generating a set of training data by repeatedly:

detecting first state information about an environment at a first time step, wherein the first state information includes a first-mode portion about a first aspect of the environment at the first time step and a second-mode portion about a second aspect of the environment at the first time step, wherein the second aspect differs from the first aspect, and wherein the first state information is included in the set of training data;

applying the first state information to an exploration policy to generate a first action, wherein the first action is included in the set of training data;

performing the first action in the environment;

detecting second state information about the environment at a second time step that is a result of performing the first action in the environment, wherein the second state information includes a first-mode portion about the first aspect of the environment at the second time step and a second-mode portion about the second aspect of the environment at the second time step, and wherein the second state information is included in the set of training data;

generating a predicted second-mode portion of the second state information by (i) applying the first-mode portion of the second state information to an encoder to generate an encoder output, and (ii) applying the encoder output to a decoder to generate the predicted second-mode portion of the second state information; and updating the exploration policy and the decoder by evaluating a loss function that is based on a difference between the second-mode portion of the second state information as detected and as predicted; and based on the set of training data generated during the exploration period, training an exploitation policy to generate, based on input state information about the environment, a second action such that performance of the second action improves an objective function, wherein the input state information includes a first-mode portion about the first aspect of the environment and a second-mode portion about the second aspect of the environment.

13. The computer-implemented method of claim 12, wherein the first-mode portions of the first and second state information comprise visual information about the environment and wherein the second-mode portions of the first and second state information comprise haptic information about the environment.

14. The computer-implemented method of claim 13, further comprising:

generating a predicted first-mode portion of the second state information by applying the encoder output and the first action to a forward model to generate a predicted n encoder output, wherein updating the exploration policy and the decoder by evaluating the loss function comprises evaluating a further loss function that is based on (i) the difference between the second-mode portion of the second state information as detected and as predicted, and (ii) a difference between the first-mode portion of the second state information as detected and as predicted.

15. The computer-implemented method of claim 12, further comprising:
generating the encoder randomly or pseudo-randomly.

16. The computer-implemented method of claim 12, further comprising:
updating the encoder based on the loss function.

17. The computer-implemented method of claim 12, wherein the first-mode portion and second-mode portion of the first and second state information comprise information about respective different aspects of incident reports related to a network.

18. The computer-implemented method of claim 12, wherein the first-mode portion and second-mode portion of the first state information comprises information about one or more requests received from a user of a network, and wherein the first action specified a communication to the user in response to the one or more requests.

19. The computer-implemented method of claim 18, further comprising:
generating the first state information and second state information by simulating operation of the network and action of the user based on the first action and a database that contains a plurality of text-based records related to the network.

20. The computer-implemented method of claim 18, wherein the second-mode portion of the first state information depicts at least one of an authorization status of the user, a name of the user, an organizational status of the user, an identity or status of hardware associated with the user, or an identity or status of software associated with the user.

* * * * *